(12) United States Patent
Du et al.

(10) Patent No.: US 10,449,514 B2
(45) Date of Patent: Oct. 22, 2019

(54) CORE-SHELL COMPOSITIONS, METHODS OF MAKING THE SAME, AND GAS SEPARATION PROCESSES USING THE SAME

(71) Applicant: ExxonMobil Research and Engineering Company, Annandale, NJ (US)

(72) Inventors: Yi Du, Coopersburg, PA (US); Edward W. Corcoran, Jr., Nazareth, PA (US); Andrew I. Cooper, Liverpool (GB); Tom M. Hasell, Liverpool (GB); Shan Jiang, Liverpool (GB)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 147 days.

(21) Appl. No.: 15/825,501

(22) Filed: Nov. 29, 2017

(65) Prior Publication Data
US 2018/0169612 A1   Jun. 21, 2018

Related U.S. Application Data

(60) Provisional application No. 62/436,124, filed on Dec. 19, 2016.

(51) Int. Cl.
*B01J 20/22* (2006.01)
*B01J 20/28* (2006.01)
(Continued)

(52) U.S. Cl.
CPC .............. *B01J 20/22* (2013.01); *B01D 53/02* (2013.01); *B01J 20/28007* (2013.01);
(Continued)

(58) Field of Classification Search
CPC ...... B01D 53/02; B01D 53/04; B01D 53/047; B01D 53/0462; B01D 53/0473;
(Continued)

(56) References Cited

U.S. PATENT DOCUMENTS

2003/0044612 A1\* 3/2003 Kaeding ................ B01J 20/282
428/407
2008/0028286 A1   1/2008 Chick
(Continued)

FOREIGN PATENT DOCUMENTS

WO   2016174468 A1   3/2016

OTHER PUBLICATIONS

Holst, et al., "Porous organic molecules", Nature Chemistry, Oct. 22, 2010, 915-920, vol. 2, Nature Publishing Group.
(Continued)

*Primary Examiner* — Frank M Lawrence, Jr.
(74) *Attorney, Agent, or Firm* — Priya G. Prasad

(57) ABSTRACT

Porous organic compositions including a core comprising nitrogen-containing molecules and a shell comprising nitrogen-containing compounds wherein the shell is non-chemically bonded to the core are provided herein. Processes for making the porous organic compositions as well as gas separation processes using the porous organic compositions are also provided herein.

24 Claims, 10 Drawing Sheets

(51) Int. Cl.
*B01J 20/32* (2006.01)
*B01D 53/02* (2006.01)
*B01D 53/047* (2006.01)
*B01D 53/04* (2006.01)

(52) U.S. Cl.
CPC ... *B01J 20/28016* (2013.01); *B01J 20/28064* (2013.01); *B01J 20/3206* (2013.01); *B01J 20/3246* (2013.01); *B01J 20/3293* (2013.01); *B01D 53/0462* (2013.01); *B01D 53/0473* (2013.01); *B01D 2253/20* (2013.01); *B01D 2253/25* (2013.01); *B01D 2253/304* (2013.01); *B01D 2253/34* (2013.01); *B01D 2257/102* (2013.01); *B01D 2257/108* (2013.01); *B01D 2257/11* (2013.01); *B01D 2257/504* (2013.01); *B01D 2257/7025* (2013.01)

(58) Field of Classification Search
CPC ............ B01D 2253/20; B01D 2253/25; B01D 2253/304; B01D 2257/102; B01D 2257/108; B01D 2257/11; B01D 2257/504; B01D 2257/7025; B01J 20/22; B01J 20/28007; B01J 20/28016; B01J 20/28064; B01J 20/3206; B01J 20/3246; B01J 20/3293
USPC .............. 96/108; 95/96, 127, 130, 139, 143; 502/401
See application file for complete search history.

(56) References Cited

U.S. PATENT DOCUMENTS

| | | | |
|---|---|---|---|
| 2008/0282884 A1 | 11/2008 | Kelley et al. | |
| 2008/0282885 A1 | 11/2008 | Deckman et al. | |
| 2008/0282886 A1 | 11/2008 | Reyes et al. | |
| 2008/0282887 A1 | 11/2008 | Chance et al. | |
| 2008/0282892 A1 | 11/2008 | Deckman et al. | |
| 2010/0222619 A1* | 9/2010 | Koh | C07C 1/0445 585/250 |
| 2013/0112605 A1* | 5/2013 | Wyndham | B01J 20/283 210/198.3 |
| 2015/0050583 A1* | 2/2015 | Schuth | B01J 37/084 429/524 |
| 2016/0175759 A1* | 6/2016 | Carstensen | B01J 20/183 |
| 2017/0128910 A1* | 5/2017 | Cooper | B01J 20/22 |
| 2018/0008958 A1* | 1/2018 | Choi | B01J 20/20 |

OTHER PUBLICATIONS

Slater et al., "Porous materials. Function-led design of new porous materials", Science, May 29, 2015, vol. 348, iss. 6238, American Association for the Advancement of Science.
Tozawa et al., "Porous organic cages", Nature Materials, Oct. 25, 2009, pp. 973-978, Nature Publishing Group.
Foo et al., "Functional Hybrid Porous Coordination Polymers", Chemistry of Materials, Nov. 4, 2013, pp. 310-322, vol. 26(1), ACS Publications.
McGuire et al., "The surface chemistry of metal-organic frameworks," Chemical Communications, Aug. 4, 2014, pp. 5199-5217, vol. 51, The Royal Society of Chemistry.
Chen et al., "Separation of rare gases and chiral molecules by selective binding in porous organic cages", Nature Materials, 2014, pp. 954-960, vol. 13, Nature Publishing Group.
Hasell et al., "Porous Organic Alloys", Angewandte Chemie International Edition, Jun. 8, 2012, pp. 7154-7157, vol. 51, Wiley Online Library.
Jiang et al., "Direct thermolysis of CO2 into CO and O2", Chemical Communications, 2017, pp. 1188-1191, vol. 53, The Royal Society of Chemistry.
Hasell et al., "Controlling the Crystallization of Porous Organic Cages: Molecular Analogs of Isoreticular Frameworks Using Shape-Specific Directing Solvents", Journal of the American Chemical Society, 2014, pp. 1438-1448, vol. 136(4), American Chemical Society.
Jones et al., "Modular and predictable assembly of porous organic molecular crystals", Nature, Jun. 16, 2011, pp. 367-371, vol. 474, Nature Publishing Group.
Giri et al., "Liquids with permanent porosity", Nature, 2015, pp. 216-220, vol. 527, Nature Publishing Group.
Liu et al. "Acid- and Base-Stable Porous Organic Cages: Shape Persistence and pH Stability via Post-synthetic "Tying" of a Flexible Amine Cage", Journal of the American Chemical Society, 2014, pp. 7583-7586, vol. 136(21), American Chemical Society.
Bojdys et al., "Supramolecular Engineering of Intrinsic and Extrinsic Porosity in Covalent Organic Cages", Journal of the American Chemical Society, 2011, pp. 16566-16571, vol. 133(41), American Chemical Society.
The International Search Report and Written Opinion of PCT/US2017/063609 dated Mar. 5, 2018.
Hasell et al., "Porous organic cage nanocrystals by solution mixing", J. Am. Chem. Soc., 2011, 134, 588-598.
Little et al., "Trapping virtual pores by crystal retro-engineering", Nature Chem., 2015, 7, 153-159.
Little et al., "Supplementary Information to 'Trapping virtual pores by crystal retro-engineering'", Nature Chem, 2015, 7, S1-S64.
Song et al., "Porous Organic Cage Thin Films and Molecular-Sieving Membranes", Adv. Mat., 2016, 28, 2629-2637.
Song et al., "Supporting Information to 'Porous organic cage thin films and molecular-sieving membranes'", Adv. Mat., 2016, 28, S1-S22.

\* cited by examiner

**CC3-*RS***

**CC16-*RS***

**CC3-*R*/CC15-*S***

**CC3-*RS*$_{core}$/CC16-*RS*$_{shell}$**

**CC16-*RS*$_{core}$/CC3-*RS*$_{shell}$**

**CC3-*RS*$_{core}$/CC3*R*-CC15*S*$_{shell}$**

CORE-SHELL COMPOSITIONS, METHODS OF MAKING THE SAME, AND GAS SEPARATION PROCESSES USING THE SAME

CROSS-REFERENCE TO RELATED APPLICATIONS

This application claims the benefit of U.S. Provisional Application No. 62/436,124, filed on Dec. 19, 2016, the entire contents of which are incorporated herein by reference.

FIELD

This invention relates to nitrogen-containing porous core-shell compositions, methods of making the same, and gas separation processes using the same.

BACKGROUND

Gas separation is important in many industries for removing undesirable contaminants from a gas stream and for achieving a desired gas composition. For example, natural gas from many gas fields can contain significant levels of $H_2O$, $SO_2$, $H_2S$, $CO_2$, $N_2$, mercaptans, and/or heavy hydrocarbons that have to be removed to various degrees before the gas can be transported to market. It is preferred that as much of the acid gases $H_2S$ and $CO_2$ be removed from natural gas as possible to leave methane as the recovered component. Small increases in recovery of methane can result in significant improvements in process economics and also serve to prevent unwanted resource loss. It is desirable to recover more than 80 vol %, preferably more than 90 vol %, of the methane when detrimental impurities are removed.

Synthesis gas (syngas) also typically requires removal and separation of various components before it can be used in fuel, chemical and power applications because all of these applications have a specification of the exact composition of the syngas required for the process. As produced, syngas can contain at least CO and $H_2$. Other molecular components in syngas can be $CH_4$, $CO_2$, $H_2S$, $H_2O$, $N_2$, and combinations thereof. Minority (or trace) components in the gas can include hydrocarbons, $NH_3$, $NO_x$, and the like, and combinations thereof. In almost all applications, most of the $H_2S$ should typically be removed from the syngas before it can be used, and, in many applications, it can be desirable to remove much of the $CO_2$.

Additionally, separation of noble gases, such as xenon and krypton, can present an economic opportunity, but moreover, separation be required to avoid environmental hazard. For example, various nuclear processes may produce radioactive xenon and/or krypton, which cannot be safely vented to the atmosphere due to radiation hazard, and therefore, must be isolated or stored for a required period so as to be rendered harmless. Furthermore, these noble gases can be present in very low concentrations with other components; thus, selective separation is necessary.

Adsorptive gas separation techniques are common in various industries using solid sorbent materials such as activated charcoal or a porous solid oxide such as alumina, silica-alumina, silica, or a crystalline zeolite. Adsorptive separation may be achieved by equilibrium or kinetic mechanisms. A large majority of processes operate through the equilibrium adsorption of the gas mixture where the adsorptive selectivity is primarily based upon differential equilibrium uptake of one or more species based on parameters such as pore size of the adsorbent. Kinetically based separation involves differences in the diffusion rates of different components of the gas mixture and allows different species to be separated regardless of similar equilibrium adsorption parameters.

Kinetically based separation processes may be operated as pressure swing adsorption (PSA), temperature swing adsorption (TSA), partial pressure swing or displacement purge adsorption (PPSA) or as hybrid processes comprised of components of several of these processes. These swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA) technologies, with the term "swing adsorption" taken to include all of these processes and combinations of them.

Typically, zeolite adsorbents used in such gas separation processes may either have good kinetic separation selectivity for the contaminant or high capacity for the contaminant, but not both. Furthermore, the zeolite adsorbents may not have desirable surface properties, such as suitable hydrophobicity.

Thus, there is a need to provide additional adsorbent materials, which can be synthesized to have a combination of desirable functionalities including improved adsorption capacity and selectivity as well as adjustable hydrophobicity.

SUMMARY

It has been found that adsorbent materials with a combination of desirable functionalities, such as selectivity, capacity, and hydrophobicity, can be successfully prepared from non-metallic nitrogen-containing molecules arranged in a core-shell configuration.

Thus, in one aspect, this disclosure relates to a non-metallic porous organic composition comprising: a core comprising nitrogen-containing molecules; and a shell comprising nitrogen-containing molecules disposed around the core; wherein the shell is non-chemically bonded to the core; and wherein at least one of the core nitrogen-containing molecules is different from at least one of the shell nitrogen-containing molecules.

In still another aspect, this disclosure relates to a method of making the non-metallic porous organic composition as described herein. The method comprises sequentially adding a solution of the nitrogen-containing molecules and a solvent to the core molecules to create a product and evaporating the product to obtain the non-metallic porous organic composition as described herein.

In still another aspect, this disclosure relates to a gas separation process comprising contacting a gas mixture containing at least one contaminant with the non-metallic porous organic composition as described herein.

Other embodiments, including particular aspects of the embodiments summarized above, will be evident from the detailed description that follows.

BRIEF DESCRIPTION OF THE DRAWINGS

FIGS. 1b-1d illustrate scanning electron microscope (SEM) images of Sample 1a.

DETAILED DESCRIPTION

Figure 1A:
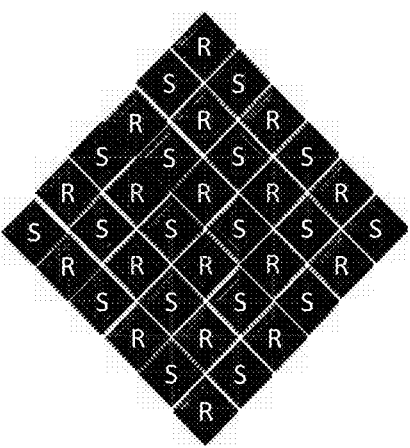
FIG. 1a illustrates a schematic of co-molecules forming the core and co-molecules forming the shell, such as Sample 1.

In various aspects of the invention, catalysts and methods for preparing catalysts are provided.

I. DEFINITIONS

For purposes of this invention and the claims hereto, the numbering scheme for the Periodic Table Groups is according to the IUPAC Periodic Table of Elements.

The term "and/or" as used in a phrase such as "A and/or B" herein is intended to include "A and B", "A or B", "A", and "B".

The terms "substituent", "radical", and "group" may be used interchangeably.

As used herein, the term "adsorption" includes physisorption, chemisorption, and condensation onto a solid support, adsorption onto a solid support liquid, chemisorption onto a solid supported liquid and combinations thereof.

As used herein, the term "average particle size" refers to the average diameter of the particle, e.g., number average of the major axis and minor axis.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

As used herein, and unless otherwise specified, the term "alkyl" refers to a saturated hydrocarbon radical having from 1 to 1000 carbon atoms (i.e. $C_1$-$C_{1000}$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl (—$CH_3$), "$C_2$ alkyl" refers to ethyl (—$CH_2CH_3$), "$C_3$ alkyl" refers to propyl (—$CH_2CH_2CH_3$) and "$C_4$ alkyl" refers to butyl (e.g. —$CH_2CH_2CH_2CH_3$, —$(CH_3)CHCH_2CH_3$, —$CH_2CH(CH_3)_2$, etc.). Further, as used herein, "Me" refers to methyl, and "Et" refers to ethyl, "i-Pr" refers to isopropyl, "t-Bu" refers to tert-butyl, and "Np" refers to neopentyl.

As used herein, and unless otherwise specified, the term "alkylene" refers to a divalent alkyl moiety containing 1 to 12 carbon atoms (i.e. $C_1$-$C_{12}$ alkylene) in length and meaning the alkylene moiety is attached to the rest of the molecule at both ends of the alkyl unit. For example, alkylenes include, but are not limited to, —$CH_2$—, —$CH_2CH_2$—, —$CH(CH_3)CH_2$—, —$CH_2CH_2CH_2$—, etc. The alkylene group may be linear or branched.

As used herein, and unless otherwise specified, the term "aromatic" refers to unsaturated cyclic hydrocarbons having a delocalized conjugated it system and having from 4 to 20 carbon atoms (aromatic $C_4$-$C_{20}$ hydrocarbon). Exemplary aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof. The aromatic may optionally be substituted, e.g., with one or more alkyl group, alkoxy group, halogen, etc. Additionally, the aromatic may comprise one or more heteroatoms. Examples of heteroatoms include, but are not limited to, nitrogen, oxygen, and/or sulfur. Aromatics with one or more heteroatom include, but are not limited to furan, benzofuran, thiophene, benzothiophene, oxazole, thiazole and the like, and combinations thereof. The aromatic may comprise monocyclic, bicyclic, tricyclic, and/or polycyclic rings (in some embodiments, at least monocyclic rings, only monocyclic and bicyclic rings, or only monocyclic rings) and may be fused rings.

As used herein, the term "hydrogen" refers to a hydrogen radical and may be depicted as —H.

As used herein, the term "phenyl" refers to a cyclic group of atoms with the formula $C_6H_5$—.

As used herein, the term "volume adsorptive capacity" refers to the percentage of the volume of the adsorbent material accessible to the molecule that can be adsorbed.

II. POROUS ORGANIC COMPOSITIONS

Porous organic compositions are provided herein. The compositions may comprise a core comprising nitrogen-containing molecules and a shell comprising nitrogen-containing molecules disposed around the core, wherein the shell is non-chemically bonded to the core. Further, at least one of the core nitrogen-containing molecules may be different from at least one of the shell nitrogen-containing molecules. Advantageously, the compositions described herein may be efficiently synthesized in the core-shell configuration to have a combination of desirable and tailorable functionalities, such as capacity, selectivity and hydrophobicity. The porous organic compositions described herein may comprise metals or may not comprise metals (non-metallic). In one embodiment, non-metallic porous organic compositions are provided.

In various aspects, the nitrogen-containing molecules may comprise one or more moieties selected from the group consisting of:

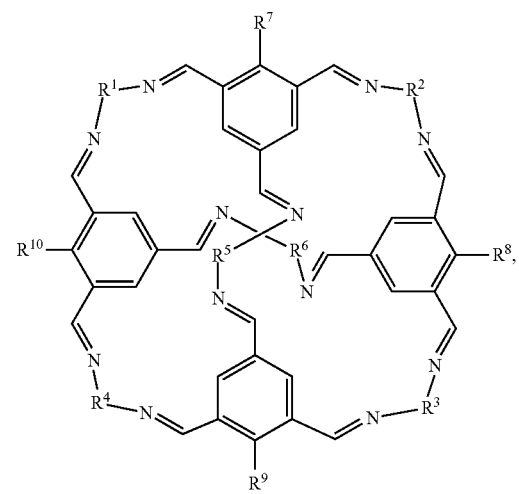

(I)

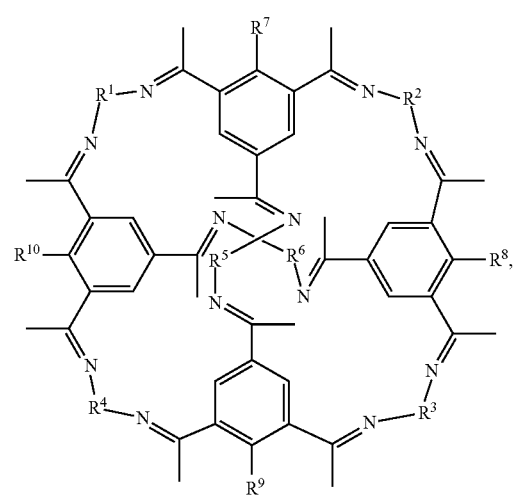

(II)

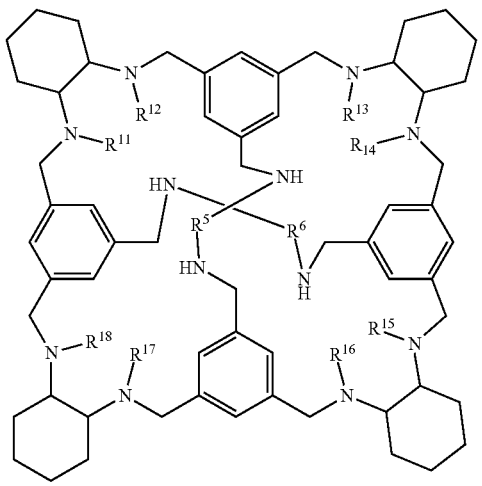

(III)

, and

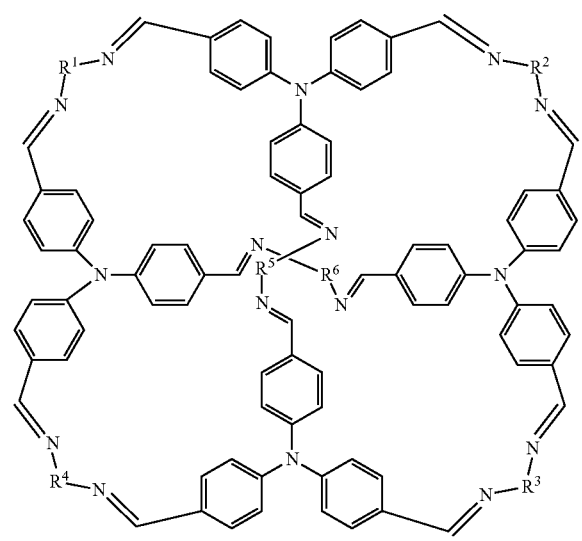

(IV)

;

wherein:

$R^1$, $R^2$, $R^3$, $R^4$, $R^5$, and $R^6$ are each independently

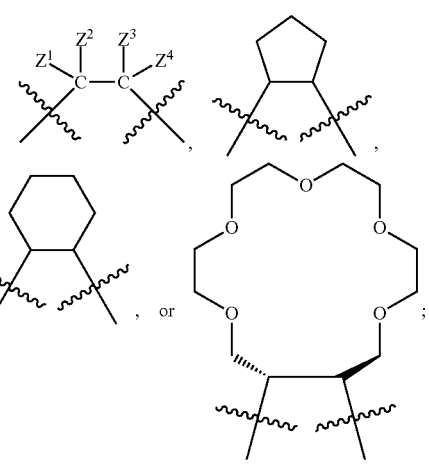

, or ;

wherein $Z^1$, $Z^2$, $Z^3$, and $Z^4$ are each independently hydrogen, a $C_1$-$C_4$ alkyl or an optionally substituted aromatic group; $R^7$, $R^8$, $R^9$, and $R^{10}$ are each independently hydrogen or a hydroxyl; and $R^{11}$, $R^{12}$, $R^{13}$, $R^{14}$, $R^{15}$, $R^{16}$, $R^{17}$, and $R^{18}$ are each independently hydrogen or one or more of $R^{11}$ and $R^{12}$, $R^{13}$ and $R^{14}$, $R^{15}$ and $R^{16}$, or $R^{17}$ and $R^{18}$ are bonded to an optionally substituted $C_1$-$C_4$ alkylene.

It is understood herein that moieties (I)-(IV) may also be referred to as cage structures as known in the art.

$R^1$, $R^2$, $R^3$, $R^4$, $R^5$, and $R^6$, at each occurrence, can be the same or different. For example, $R^1$, $R^2$, $R^3$, $R^4$, $R^5$, and $R^6$ may all be

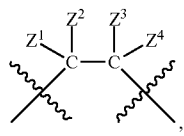

or all be

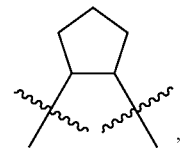 [SMILES: *C1CCCC1*]

or all be

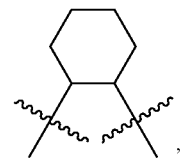 [SMILES: *C1CCCCC1*]

or all be

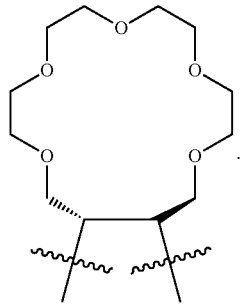

$Z^1$, $Z^2$, $Z^3$, and $Z^4$, at each occurrence, can be the same or different. For example, $Z^1$, $Z^2$, $Z^3$, and $Z^4$ all may be hydrogen, or all may be a $C_1$-$C_4$ alkyl or all may be an optionally substituted aromatic group. The aromatic group be substituted one or more times with a halogen, such as, but not limited to F, Cl and/or Br. In particular, the aromatic group may be substituted one or more times (e.g., twice) with F.

In certain variations, up to and including three of $Z^1$, $Z^2$, $Z^3$, and $Z^4$ may be a $C_1$-$C_4$ alkyl and at least one of $Z^1$, $Z^2$, $Z^3$, and $Z^4$ may be hydrogen. For example, at least one or at least two of $Z^1$, $Z^2$, $Z^3$, and $Z^4$ may be a $C_1$-$C_4$ alkyl and at least two or at least three of $Z^1$, $Z^2$, $Z^3$, and $Z^4$ may be hydrogen. In a particular, at least one, at least two or at least three of $Z^1$, $Z^2$, $Z^3$, and $Z^4$ may be a $C_1$-$C_2$ alkyl and at least one, at least two or at least three of $Z^1$, $Z^2$, $Z^3$, and $Z^4$ may be hydrogen. Additionally or alternatively, at least one, at least two or at least three of $Z^1$, $Z^2$, $Z^3$, and $Z^4$ may be methyl and at least one, at least two or at least three of $Z^1$, $Z^2$, $Z^3$, and $Z^4$ may be hydrogen.

In other embodiments, up to and including three of $Z^1$, $Z^2$, $Z^3$, and $Z^4$ may be an optionally substituted aromatic group and at least one of $Z^1$, $Z^2$, $Z^3$, and $Z^4$ may be hydrogen. For example, at least one or at least two of $Z^1$, $Z^2$, $Z^3$, and $Z^4$ may be an optionally substituted aromatic group and at least two or at least three of $Z^1$, $Z^2$, $Z^3$, and $Z^4$ may be hydrogen. In particular, the optionally substituted aromatic group may be a phenyl group, optionally substituted one or more times with F.

In a particular embodiment, $Z^1$, $Z^2$, $Z^3$, and $Z^4$ can each independently be hydrogen, a $C_1$-$C_3$ alkyl or a phenyl group. Additionally or alternatively, $Z^2$, $Z^3$, and $Z^4$ can each independently be hydrogen, a $C_1$-$C_2$ alkyl or a phenyl group. Additionally or alternatively, $Z^2$, $Z^3$, and $Z^4$ can each independently be hydrogen, methyl or a phenyl group.

In another embodiment, $R^1$, $R^2$, $R^3$, $R^4$, $R^5$, and $R^6$ each independently may be

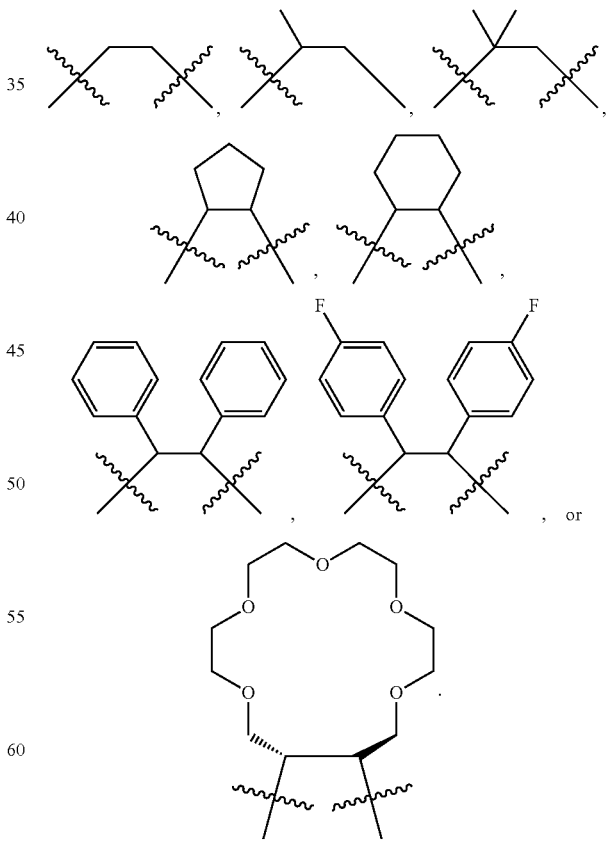

In one embodiment, up to and including six of $R^1$, $R^2$, $R^3$, $R^4$, $R^5$, and $R^6$ may each be For example, at least one of, at least two of, at least three of, at least four of, at least five of, or at least six of $R^1$, $R^2$, $R^3$, $R^4$, $R^5$, and $R^6$ may each be

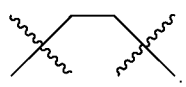

For example, at least one of, at least two of, at least three of, at least four of, at least five of, or at least six of $R^1$, $R^2$, $R^3$, $R^4$, $R^5$, and $R^6$ may each be

In another embodiment, up to and including six of $R^1$, $R^2$, $R^3$, $R^4$, $R^5$, and $R^6$ may each be

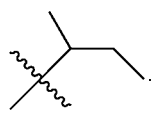 [SMILES: *C(C)CC]

For example, at least one of, at least two of, at least three of, at least four of, at least five of, or at least six of $R^1$, $R^2$, $R^3$, $R^4$, $R^5$, and $R^6$ may each be

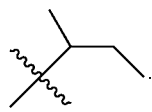 [SMILES: *C(C)CC]

In another embodiment, up to and including six of $R^1$, $R^2$, $R^3$, $R^4$, $R^5$, and $R^6$ may each be

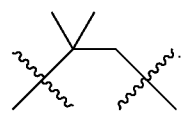 [SMILES: *CC(*)(C)C]

For example, at least one of, at least two of, at least three of, at least four of, at least five of, or at least six of $R^1$, $R^2$, $R^3$, $R^4$, $R^5$, and $R^6$ may each be

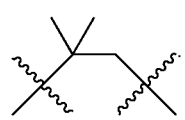 [SMILES: *CC(*)(C)C]

In another embodiment, up to and including six of $R^1$, $R^2$, $R^3$, $R^4$, $R^5$, and $R^6$ may each be

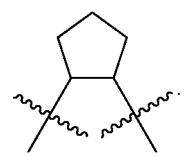 [SMILES: *C1CCCC1*]

For example, at least one of, at least two of, at least three of, at least four of, at least five of, or at least six of $R^1$, $R^2$, $R^3$, $R^4$, $R^5$, and $R^6$ may each be

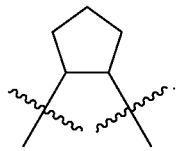 [SMILES: *C1CCCC1*]

In another embodiment, up to and including six of $R^1$, $R^2$, $R^3$, $R^4$, $R^5$, and $R^6$ may each be

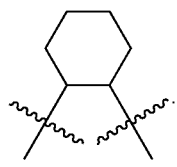 [SMILES: *C1CCCCC1*]

For example, at least one of, at least two of, at least three of, at least four of, at least five of, or at least six of $R^1$, $R^2$, $R^3$, $R^4$, $R^5$, and $R^6$ may each be

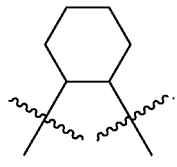

In another embodiment, up to and including six of $R^1$, $R^2$, $R^3$, $R^4$, $R^5$, and $R^6$ may each be

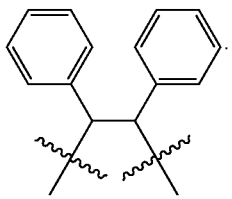 [SMILES: *C(c1ccccc1)C(*)c1ccccc1]

For example, at least one of, at least two of, at least three of, at least four of, at least five of, or at least six of $R^1$, $R^2$, $R^3$, $R^4$, $R^5$, and $R^6$ may each be

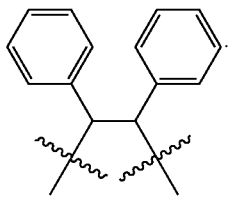 [SMILES: *C(c1ccccc1)C(*)c1ccccc1]

In another embodiment, up to and including six of $R^1$, $R^2$, $R^3$, $R^4$, $R^5$, and $R^6$ may each be

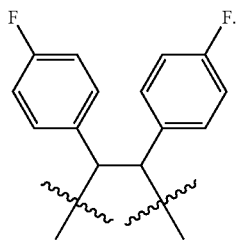 [SMILES: *C(c1ccc(F)cc1)C(*)c1ccc(F)cc1]

For example, at least one of, at least two of, at least three of, at least four of, at least five of, or at least six of $R^1$, $R^2$, $R^3$, $R^4$, $R^5$, and $R^6$ may each be

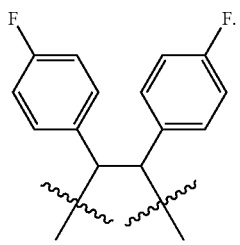 [SMILES: *C(c1ccc(F)cc1)C(*)c1ccc(F)cc1]

In another embodiment, up to and including six of $R^1$, $R^2$, $R^3$, $R^4$, $R^5$, and $R^6$ may each be

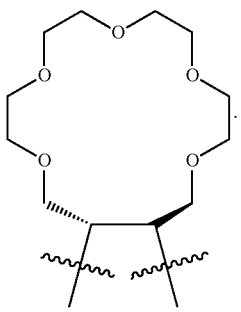

For example, at least one of, at least two of, at least three of, at least four of, at least five of, or at least six of $R^1$, $R^2$, $R^3$, $R^4$, $R^5$, and $R^6$ may each be

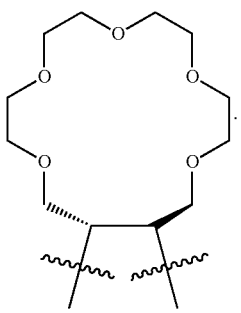

$R^7$, $R^8$, $R^9$, and $R^{10}$ at each occurrence, can be the same or different. For example, $R^7$, $R^8$, $R^9$, and $R^{10}$ may all be hydrogen or may all be hydroxyl.

Alternatively, up to and including three of $R^7$, $R^8$, $R^9$, and $R^{10}$ may each be hydrogen. For example, at least one of or at least two of $R^7$, $R^8$, $R^9$, and $R^{10}$ may each be hydrogen.

Alternatively, up to and including three of $R^7$, $R^8$, $R^9$, and $R^{10}$ may each be hydroxyl. For example, at least one of or at least two of $R^7$, $R^8$, $R^9$, and $R^{10}$ may each be hydroxyl.

In various aspects, $R^{11}$, $R^{12}$, $R^{13}$, $R^{14}$, $R^{15}$, $R^{16}$, $R^{17}$, and $R^{18}$ may all be hydrogen.

Alternatively, up to and including six of $R^{11}$, $R^{12}$, $R^{13}$, $R^{14}$, $R^{15}$, $R^{16}$, $R^{17}$, and $R^{18}$ may each be hydrogen. For example, at least one of, at least two of, at least three of, at least four of, or at least five of $R^{11}$, $R^{12}$, $R^{13}$, $R^{14}$, $R^{15}$, $R^{16}$, $R^{17}$, and $R^{18}$ may each be hydrogen.

In another embodiment, up to and including four of $R^{11}$ and $R^{12}$, $R^{13}$ and $R^{14}$, $R^{15}$ and $R^{16}$, or $R^{17}$ and $R^{18}$ are bonded to an optionally substituted $C_1$-$C_4$ alkylene. For example, at least one of, at least two of, or least three of $R^{11}$ and $R^{12}$, $R^{13}$ and $R^{14}$, $R^{15}$ and $R^{16}$, or $R^{17}$ and $R^{18}$ are bonded to an optionally substituted $C_1$-$C_4$ alkylene.

The $C_1$-$C_4$ alkylene may be optionally substituted with one or more $C_1$-$C_4$ alkyl, particularly methyl or ethyl.

In another embodiment, up to and including four of $R^{11}$ and $R^{12}$, $R^{13}$ and $R^{14}$, $R^{15}$ and $R^{16}$, or $R^{17}$ and $R^{18}$ are bonded to an optionally substituted $C_1$-$C_2$ alkylene. For example, at least one of, at least two of, or least three of $R^{11}$ and $R^{12}$, $R^{13}$ and $R^{14}$, $R^{15}$ and $R^{16}$, or $R^{17}$ and $R^{18}$ are bonded to an optionally substituted $C_1$-$C_2$ alkylene. In particular, the optionally substituted $C_1$-$C_2$ alkylene may be —$CH_2$—, —$CH(CH_3)$—, —$C(CH_3)_2$—, —$CH_2CH_2$—, —$CH(CH_3)CH(CH_3)$—, or —$CH(CH_3)CH_2$—.

In another embodiment, one or more of $R^{11}$ and $R^{12}$, $R^{13}$ and $R^{14}$, $R^{15}$ and $R^{16}$, or $R^{17}$ and $R^{18}$ are bonded to an optionally substituted $C_1$-$C_2$ alkylene.

In a particular embodiment, the nitrogen-containing molecules may comprise moieties corresponding in structure to moiety (I) or moiety (II), wherein $R^7$, $R^8$, $R^9$, and $R^{10}$ may each be hydrogen. Additionally or alternatively, $R^1$, $R^2$, $R^3$, $R^4$, $R^5$, and $R^6$ each independently may be

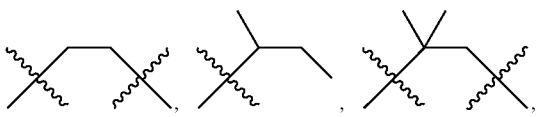

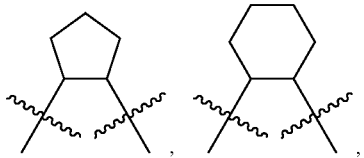

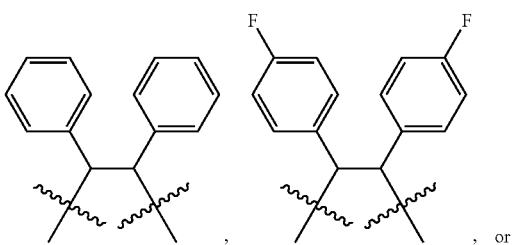

, or

-continued

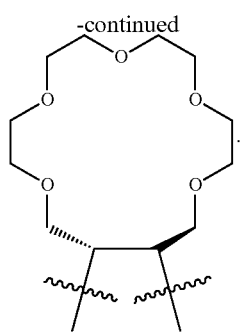

In another particular embodiment, the nitrogen-containing molecules may comprise a moiety corresponding in structure to moiety (I), wherein $R^7$, $R^8$, $R^9$, and $R^{10}$ may each be hydroxyl. $R^1$, $R^2$, $R^3$, $R^4$, $R^5$, and $R^6$ each independently may be

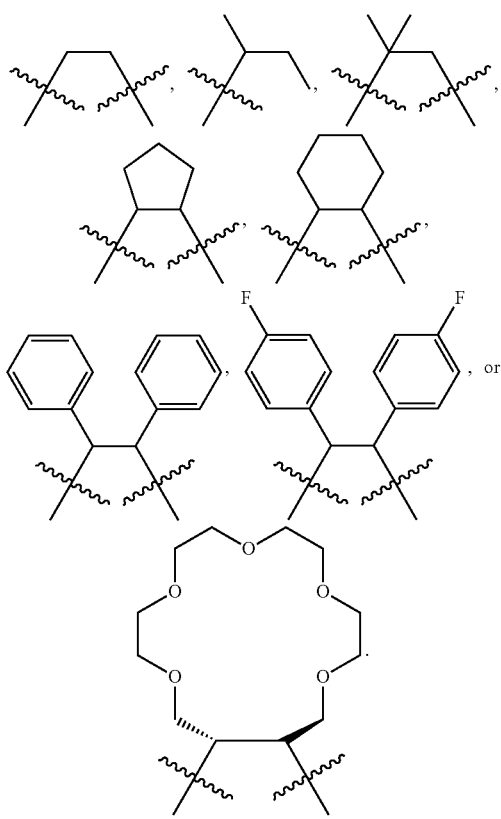

In another particular embodiment, the nitrogen-containing molecules may comprise moieties corresponding in structure to moiety (II) or moiety (IV), wherein $R^1$, $R^2$, $R^3$, $R^4$, $R^5$, and $R^6$ each independently may be

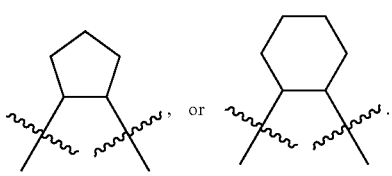 [SMILES: *C1CCCC1* ; *C1CCCCC1*]

In another particular embodiment, the nitrogen-containing molecules may comprise moieties corresponding in structure to moiety (III), wherein $R^5$ and $R^6$ may each be

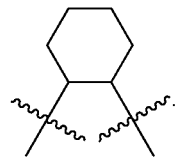

It is contemplated herein, that the nitrogen-containing molecules described herein may be present as isomers. Thus, the nitrogen-containing molecules described herein may comprise the R enantiomer, the S enantiomer or racemate (mixture of R and S enantiomers). For example, each of moieties (I), (II), (III) and (IV) may be present as the R enantiomer, the S enantiomer or racemate.

Examples of nitrogen-containing molecules corresponding in structure to moieties (I)-(IV) are shown in Table 1.

TABLE 1

| Nitrogen-Containing Molecule Species | Moiety | Substituents |
|---|---|---|
| CC1 | (I) | $R^1$, $R^2$, $R^3$, $R^4$, $R^5$, and $R^6$ are ⌇⌇; and $R^7$, $R^8$, $R^9$, and $R^{10}$ are each hydrogen |
| CC2 | (I) | $R^1$, $R^2$, $R^3$, $R^4$, $R^5$, and $R^6$ are ⌇⌇; and $R^7$, $R^8$, $R^9$, and $R^{10}$ are each hydrogen |
| CC3 | (I) | $R^1$, $R^2$, $R^3$, $R^4$, $R^5$, and $R^6$ are ⌇⌇; and $R^7$, $R^8$, $R^9$, and $R^{10}$ are each hydrogen |
| CC4 | (I) | $R^1$, $R^2$, $R^3$, $R^4$, $R^5$, and $R^6$ are ⌇⌇; and $R^7$, $R^8$, $R^9$, and $R^{10}$ are each hydrogen |
| CC9 | (I) | $R^1$, $R^2$, $R^3$, $R^4$, $R^5$, and $R^6$ are ⌇⌇; and $R^7$, $R^8$, $R^9$, and $R^{10}$ are each hydrogen |

TABLE 1-continued

| Nitrogen-Containing Molecule Species | Moiety | Substituents |
|---|---|---|
| CC10 | (I) | $R^1$, $R^2$, $R^3$, $R^4$, $R^5$, and $R^6$ are [4-fluorophenyl groups]; and $R^7$, $R^8$, $R^9$, and $R^{10}$ are each hydrogen |
| CC13 | (I) | $R^1$, $R^2$, $R^3$, $R^4$, $R^5$, and $R^6$ are [methyl groups]; and $R^7$, $R^8$, $R^9$, and $R^{10}$ are each hydrogen |
| CC15 | (II) | $R^1$, $R^2$, $R^3$, $R^4$, $R^5$, and $R^6$ are [cyclohexyl-derived]; and $R^7$, $R^8$, $R^9$, and $R^{10}$ are each hydrogen |
| CC16 | (I) | $R^1$, $R^2$, $R^3$, $R^4$, $R^5$, and $R^6$ are [cyclohexyl-derived]; and $R^7$, $R^8$, $R^9$, and $R^{10}$ are each hydroxyl |
| RCC3 | (III) | $R^5$, and $R^6$ are [cyclohexyl]; $R^{11}$, $R^{12}$, $R^{13}$, $R^{14}$, $R^{15}$, $R^{16}$, $R^{17}$, and $R^{18}$ are hydrogen. |
| AT-RCC3 | (III) | $R^5$, and $R^6$ are [cyclohexyl]; $R^{11}$ and $R^{12}$ are bonded to —C(CH$_3$)$_2$—; and $R^{13}$, $R^{14}$, $R^{15}$, $R^{16}$, $R^{17}$, and $R^{18}$ are hydrogen. |
| TRCC3 | (III) | $R^5$, and $R^6$ are [cyclohexyl]; $R^{11}$ and $R^{12}$ are bonded to —CH$_2$—; $R^{13}$ and $R^{14}$ are bonded to —CH$_2$—; $R^{15}$ and $R^{16}$ are bonded to —CH$_2$—; and $R^{17}$ and $R^{18}$ are bonded to —CH$_2$—. |
| CC7 | (IV) | $R^1$, $R^2$, $R^3$, $R^4$, $R^5$, and $R^6$ are [cyclohexyl-derived] |
| Crown Ether | (I) | $R^1$, $R^2$, $R^3$, $R^4$, $R^5$, and $R^6$ are [crown ether oxygens]; and $R^7$, $R^8$, $R^9$, and $R^{10}$ are each hydrogen |

Further nitrogen containing molecule species include, but are not limited to CC8, as described and prepared in Jelfs, K. et al. (2011) *Angew. Chem. Int. Ed.*, 50: 10652-10656, and TCC1, TCC2, and TCC3, as described and prepared in Chen, L., et al. (2014) *Nat. Mater.*, 13: 954-960.

In one embodiment, the nitrogen-containing molecules may be selected from the group consisting of CC1, CC2, CC3, CC4, CC7, CC8, CC9, CC10, CC13, CC15, CC16, RCC3, AT-RCC3, TRCC3, TCC1, TCC2, TCC3, crown ether and a combination thereof.

It is further contemplated herein, that any of the nitrogen-containing molecules described herein may be in crystalline or amorphous form. In particular, the nitrogen-containing molecules may be nitrogen-containing crystals. Thus, in another embodiment, crystalline porous organic compositions are provided herein comprising a core comprising nitrogen-containing crystals and a shell comprising nitrogen-containing crystals disposed around the core, wherein the shell is non-chemically bonded to the core and wherein at least one of the core nitrogen-containing crystals is different from at least one of the shell nitrogen-containing crystals.

In various aspects, the core/shell combination may comprise any combination of moieties (I)-(IV). For example, various core/shell combinations, include, but are not limited to: moiety (I)/moiety (II), moiety (I)/moiety (III), moiety (I)/moiety (IV), moiety (II)/moiety (I), moiety (II)/moiety (III), moiety (II)/moiety (IV), moiety (III)/moiety (I), moiety (III)/moiety (II), moiety (III)/moiety (IV), moiety (IV)/moiety (I), moiety (IV)/moiety (II), and moiety (IV)/moiety (III). Further non-limiting examples of core-shell combinations are provided in Table 2 below.

TABLE 2

| Core/Shell Combinations | | | | |
|---|---|---|---|---|
| CC1/CC2 | CC4/CC13 | CC13/TRCC3 | AT-RCC3/CC1 | TCC2/CC10 |
| CC1/CC3 | CC4/CC15 | CC13/TCC1 | AT-RCC3/CC2 | TCC2/CC13 |
| CC1/CC4 | CC4/CC16 | CC13/TCC2 | AT-RCC3/CC3 | TCC2/CC15 |
| CC1/CC9 | CC4/RCC3 | CC13/TCC3 | AT-RCC3/CC4 | TCC2/CC16 |
| CC1/CC10 | CC4/AT-RCC3 | CC13/crown ether | AT-RCC3/CC9 | TCC2/RCC3 |
| CC1/CC13 | CC4/TRCC3 | CC15/CC1 | AT-RCC3/CC10 | TCC2/AT-RCC3 |
| CC1/CC15 | CC4/TCC1 | CC15/CC2 | AT-RCC3/CC13 | TCC2/TRCC3 |
| CC1/CC16 | CC4/TCC2 | CC15/CC3 | AT-RCC3/CC15 | TCC2/TCC1 |
| CC1/RCC3 | CC4/TCC3 | CC15/CC4 | AT-RCC3/CC16 | TCC2/TCC3 |
| CC1/AT-RCC3 | CC4/crown ether | CC15/CC9 | AT-RCC3/RCC3 | TCC2/crown ether |
| CC1/TRCC3 | CC9/CC1 | CC15/CC10 | AT-RCC3/TRCC3 | TCC3/CC1 |
| CC1/TCC1 | CC9/CC2 | CC15/CC13 | AT-RCC3/TCC1 | TCC3/CC2 |
| CC1/TCC2 | CC9/CC3 | CC15/CC16 | AT-RCC3/TCC2 | TCC3/CC3 |
| CC1/TCC3 | CC9/CC4 | CC15/RCC3 | AT-RCC3/TCC3 | TCC3/CC4 |
| CC1/crown ether | CC9/CC10 | CC15/AT-RCC3 | AT-RCC3/crown ether | TCC3/CC9 |
| CC2/CC1 | CC9/CC13 | CC15/TRCC3 | TRCC3/CC1 | TCC3/CC10 |
| CC2/CC3 | CC9/CC15 | CC15/TCC1 | TRCC3/CC2 | TCC3/CC13 |
| CC2/CC4 | CC9/CC16 | CC15/TCC2 | TRCC3/CC3 | TCC3/CC15 |
| CC2/CC9 | CC9/RCC3 | CC15/TCC3 | TRCC3/CC4 | TCC3/CC16 |
| CC2/CC10 | CC9/AT-RCC3 | CC15/crown ether | TRCC3/CC9 | TCC3/RCC3 |
| CC2/CC13 | CC9/TRCC3 | CC16/CC1 | TRCC3/CC10 | TCC3/AT-RCC3 |
| CC2/CC15 | CC9/TCC1 | CC16/CC2 | TRCC3/CC13 | TCC3/TRCC3 |
| CC2/CC16 | CC9/TCC2 | CC16/CC3 | TRCC3/CC15 | TCC3/TCC1 |
| CC2/RCC3 | CC9/TCC3 | CC16/CC4 | TRCC3/CC16 | TCC3/TCC2 |
| CC2/AT-RCC3 | CC9/crown ether | CC16/CC9 | TRCC3/RCC3 | TCC3/crown ether |
| CC2/TRCC3 | CC10/CC1 | CC16/CC10 | TRCC3/AT-RCC3 | crown ether/CC1 |
| CC2/TCC1 | CC10/CC2 | CC16/CC13 | TRCC3/TCC1 | crown ether/CC2 |
| CC2/TCC2 | CC10/CC3 | CC16/CC15 | TRCC3/TCC2 | crown ether/CC3 |
| CC2/TCC3 | CC10/CC4 | CC16/RCC3 | TRCC3/TCC3 | crown ether/CC4 |
| CC2/crown ether | CC10/CC9 | CC16/AT-RCC3 | TRCC3/crown ether | crown ether/CC9 |
| CC3/CC1 | CC10/CC13 | CC16/TRCC3 | TCC1/CC1 | crown ether/CC10 |
| CC3/CC2 | CC10/CC15 | CC16/TCC1 | TCC1/CC2 | crown ether/CC13 |
| CC3/CC4 | CC10/CC16 | CC16/TCC2 | TCC1/CC3 | crown ether/CC15 |
| CC3/CC9 | CC10/RCC3 | CC16/TCC3 | TCC1/CC4 | crown ether/CC16 |
| CC3/CC10 | CC10/AT-RCC3 | CC16/crown ether | TCC1/CC9 | crown ether/RCC3 |
| CC3/CC13 | CC10/TRCC3 | RCC3/CC1 | TCC1/CC10 | crown ether/AT-RCC3 |
| CC3/CC15 | CC10/TCC1 | RCC3/CC2 | TCC1/CC13 | crown ether/TRCC3 |
| CC3/CC16 | CC10/TCC2 | RCC3/CC3 | TCC1/CC15 | crown ether/TCC2 |
| CC3/RCC3 | CC10/TCC3 | RCC3/CC4 | TCC1/CC16 | crown ether/TCC3 |
| CC3/AT-RCC3 | CC10/crown ether | RCC3/CC9 | TCC1/RCC3 | crown ether/crown ether |
| CC3/TRCC3 | CC13/CC1 | RCC3/CC10 | TCC1/AT-RCC3 | |
| CC3/TCC1 | CC13/CC2 | RCC3/CC13 | TCC1/TRCC3 | |
| CC3/TCC2 | CC13/CC3 | RCC3/CC15 | TCC1/TCC2 | |
| CC3/TCC3 | CC13/CC4 | RCC3/CC16 | TCC1/TCC3 | |
| CC3/crown ether | CC13/CC9 | RCC3/AT-RCC3 | TCC1/crown ether | |
| CC4/CC1 | CC13/CC10 | RCC3/TRCC3 | TCC2/CC1 | |
| CC4/CC2 | CC13/CC15 | RCC3/TCC1 | TCC2/CC2 | |
| CC4/CC4 | CC13/CC16 | RCC3/TCC2 | TCC2/CC3 | |
| CC4/CC9 | CC13/RCC3 | RCC3/TCC3 | TCC2/CC4 | |
| CC4/CC10 | CC13/AT-RCC3 | RCC3/crown ether | TCC2/CC9 | |

It is understood herein that the core/shell combinations provided herein may include the S enantiomer, R enantiomer and racemic forms of the molecules. For example, the core/shell combination of CC1/CC2 in Table 2 includes the following combinations: CC1-RS/CC2-RS, CC1-RS/CC2-R, CC1-RS/CC2-S, CC1-R/CC2-RS, CC1-R/CC2-R, CC1-R/CC2-S, CC1-S/CC2-RS, CC1-S/CC2-R, and CC1-S/CC2-S. As used herein, "—RS" refers to the racemate, "—R" refers to the R enantiomer and "—S" refers to the S enantiomer.

In a particular embodiment, the core may comprise racemic CC3 (CC3-RS) and the shell may comprise racemic CC16 (CC16-RS).

Additionally or alternatively, the core may comprise racemic CC16 (CC16-RS) and the shell may comprise racemic CC3 (CC3-RS).

Additionally or alternatively, the core may comprise racemic CC3 (CC3-RS) and the shell may comprise racemic CC15 (CC15-RS).

Additionally or alternatively, the core may comprise racemic CC15 (CC15-RS) and the shell may comprise racemic CC3 (CC3-RS).

In various aspects, the core and the shell may be present in a weight ratio of core to shell of about 1:20, about 1:15, about 1:11, about 1:10, about 1:8, about 1:5, about 1:4, about 1:3, about 2:5; about 1:2; about 1:1; about 2:1: about 5:1; about 7:1; about 10:1; about 12:1, about 15:1, about 17:1 or about 20:1. For example, the core and the shell core may be present in a weight ratio of core to shell of about 1:20 to about 20:1, about 1:15 to about 15:1, about 1:15 to about 10:1, about 1:15 to about 5:1, about 1:11 to about 1:1, about 1:11 to about 1:2, about 1:10 to about 1:2, about 1:8 to about 1:2 or about 1:8 to about 2:5.

In some variations, the core and/or the shell may comprise a combination of nitrogen-containing molecules, also referred to as "co-molecules" or, in instances where the nitrogen containing molecules are crystals, the combination of crystals also referred to as "co-crystals." For example the core and/or shell may comprise co-molecules or co-crystals of moieties (I)-(IV), such as, but not limited to moiety (I) and (II); moiety (I) and (III); moiety (I) and (IV); moiety (II) and (III); moiety (II) and (IV); moiety (III) and (IV); moiety (I), (II), and (III); moiety (I), (II), and (IV); moiety (II), (III), and (IV); moiety (I), (III), and (IV); and moiety (I), (II), (III), and (IV). Specific non-limiting examples of co-molecules or co-crystals also include co-molecules or co-crystals comprising CC3 and CC16 or comprising CC3 and CC15. Thus, for example, the core and/or shell may comprise co-molecules or co-crystals of CC3 and CC16 and/or co-molecules or co-crystals of CC3 and CC15. The terms "co-molecules" or "co-crystals" are further defined herein to include racemic mixtures of and R enantiomer and S enantiomer crystals. For example, co-molecules or co-crystals of CC3-RS and/or CC16-RS may be present in the core and/or the shell.

The nitrogen-containing molecules may be of various shapes, such as, but not limited to octahedral, spherical, tetragonal, or a combination thereof.

Additionally or alternatively, the size of the particles in the core/shell compositions described herein may be advantageously tailored during synthesis of the core-shell compositions as further described below. In particular, the core/shell compositions may comprise particles having an average particle diameter of from about 5 nm to about 20,000 μm, about 10 nm to about 10,000 μm, about 100 nm to about 10,000 μm or about 500 nm to about 5,000 μm.

Additionally or alternatively, the core/shell compositions may have an average pore size of from about 0.10 nm to about 10 nm, about 0.10 nm to about 5.0 nm, about 0.30 nm to about 3.0 nm or about 0.30 nm to about 2.0 nm.

Further, the nitrogen-containing molecules may be soluble in common solvents (e.g., hydrocarbon-containing solvents). Thus, the nitrogen-containing molecules may form a shell and/or a core/shell interface that advantageously have substantially no cracks thereon. The substantial absence of cracks can allow for a composition with improved selectivity and/or resistance to fouling when used in gas separation processes.

In some embodiments, the core/shell composition may have a selectivity for a first component over a second component as measured by an adsorptive loading ratio. As understood in the art, an adsorptive loading ratio of a material for one component over another component, for example component A over component B, can be determined by separately measuring the uptake capacity of the material for component A and component B at similar temperatures. The adsorptive loading ratio for component A over component B=uptake capacity for component A/uptake capacity for component B.

For example, the core/shell composition may have an adsorptive loading ratio for a first component over a second component of greater than or equal to about 1, greater than or equal to about 1.2, greater than or equal to about 1.5, greater than or equal to about 2, greater than or equal to about 5, greater than or equal to about 7, greater than or equal to about 10, greater than or equal to about 12, greater than or equal to about 15, greater than or equal to about 17, greater than or equal to about 20, greater than or equal to about 30, greater than or equal to about 40, greater than or equal to about 50, greater than or equal to about 60, greater than or equal to about 70, greater than or equal to about 80, greater than or equal to about 90, or about 100. Additionally or alternatively, the core/shell composition may have a selectivity for a first component over a second component of about 1 to about 100, about 1 to about 50, about 1 to about 30, about 1 to about 20, 1.2 to about 20 or about 1.5 to about 17. Exemplary components include but are not limited to $N_2$, $H_2$, $CO_2$, $CH_4$, Xe, and Kr. For example, the core/shell composition can have an adsorptive loading ratio for $CO_2$ over $CH_4$ of greater than or equal to about 1.2.

III. PROCESSES OF MAKING THE NITROGEN-CONTAINING MOLECULES AND POROUS ORGANIC COMPOSITIONS

Methods of making porous organic compositions are provided herein. The method may comprise preparing nitrogen-containing molecules, for example, as the core molecules.

Methods of preparing nitrogen-containing molecules as described herein are known by those of ordinary skill in the art. For example, nitrogen-containing molecules comprising a moiety corresponding in structure to moiety (I) may be prepared by reacting 1,3,5-triformylbenzene with a diamine according to formula (A) below:

(A)

wherein $R^{20}$ may be selected from the group consisting of

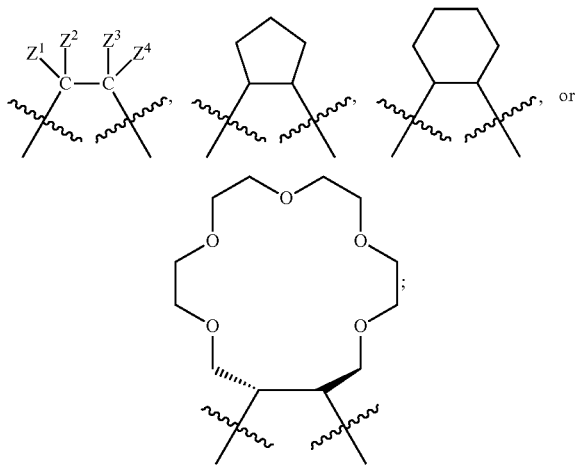

wherein $Z^1$, $Z^2$, $Z^3$, and $Z^4$ are each independently hydrogen, a $C_1$-$C_4$ alkyl or an optionally substituted aromatic group. In particular, $R^{20}$ may be selected from the group consisting of

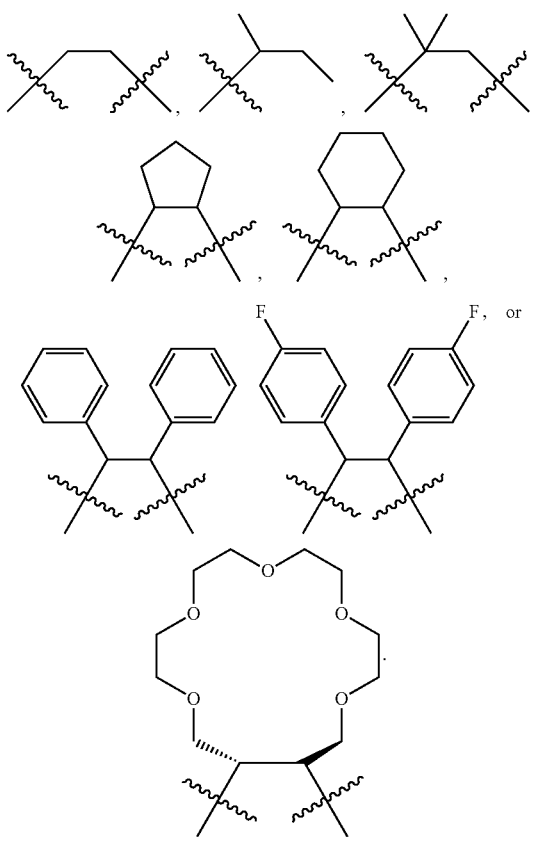

Additionally or alternatively, nitrogen-containing molecules comprising a moiety corresponding in structure to moiety (II) may be prepared by reacting 1,3,5-triacetylbenzene with the diamine according to formula (A), particularly wherein $R^{20}$ may be

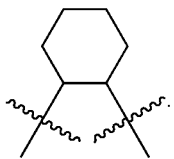

Specifically, the nitrogen-containing molecule species provided in Table 1 may be prepared according to the methods described in the following references: Holst, J. R. et al. (2010). *Nat Chem*, 2: 915; Slater, A. G. et al. (2015); *Science*, 348; Tozawa, T. et al. (2009) *Nat Mater*, 8: 973; Foo, M. L. et al. (2014) *Chemistry of Materials*, 26: 310; McGuire, C. V. et al. (2015) *Chemical Communications*, 51: 5199; Chen, L., et al. (2014) *Nat Mater*, 13: 954; Hasell, T. et al. (2012) *Angewandte Chemie International Edition*, 51: 7154; Song, Q. et al. (2016) *Advanced Materials*; Jiang, S. et al. (2016) *Chemical Communications*; Hasell, T. et al. (2014) *J. Am. Chem. Soc.*, 136: 1438; Jones, J. T. A., et al. (2011) *Nature*, 474: 367; Giri, N. et al. (2015) *Nature*, 527: 216-220; Liu, M. et al. (2014) *J. Am. Chem. Soc.*, 136(21): 7583-7586; Hasell, T. et al. (2014) *J. Am. Chem. Soc.*, 136(4): 1438-1448; and Bojdys, M. J. et al. (2011) *J. Am. Chem. Soc.*, 133:41:16566-16571.

Thus, nitrogen-containing molecules may be prepared as described above to form the core molecules. Following preparation of the core molecules, the method may comprise forming shell molecules disposed around the core molecules by sequentially adding a solution of nitrogen-containing molecules and a solvent to the core molecules to create a product. The core molecules may be in a solution. The product may be evaporated, as needed, to form the porous organic compositions described herein. Depending on the size of particles formed, evaporation may, for example, take hours or days to form the porous organic compositions. Non-limiting examples of suitable solvents include but are not limited to dichloromethane, methanol, acetone, 1,3,4-triformylbenzen and the like. The preparation methods described herein may allow for the growth of the shell molecules on the core molecules such that the shell is non-chemically bonded to the core rather than covalently bonded to the core. As discussed above, the nitrogen-containing molecules may be in crystal form; thus, crystalline porous organic compositions may be formed by the methods described herein. In such instances where nitrogen-containing crystals are used, the preparation methods described herein may allow for the crystalline growth of the shell crystals on the core crystals such that the shell is non-chemically bonded to the core rather than covalently bonded to the core.

The core molecules and the shell molecules may be added in weight ratios of core molecules to shell molecules of about 1:20, about 1:15, about 1:11, about 1:10, about 1:8, about 1:5, about 1:4, about 1:3, about 2:5; about 1:2; about 1:1; about 2:1: about 5:1; about 7:1; about 10:1; about 12:1, about 15:1, about 17:1 or about 20:1. For example, the core molecules and the shell molecules may be added in weight ratios of core molecules to shell molecules of about 1:20 to about 20:1, about 1:15 to about 15:1, about 1:15 to about 10:1, about 1:15 to about 5:1, about 1:11 to about 1:1, about 1:11 to about 1:2, about 1:10 to about 1:2, about 1:8 to about 1:2 or about 1:8 to about 2:5.

Advantageously, during the preparation method, temperature and mixing rate can be varied (e.g., from about 0.5 ml/min to about 20 ml/min) to control the resultant size of the particles of the porous organic compositions. During preparation, the solution may be under substantially continuous mixing, for example, at a speed of about 400 rpm. The preparation methods described herein may be performed at a temperature ranging from about −80° C. to about 80° C., about 10° C. to about 80° C. or about 20° C. to about 60° C. Higher temperatures my result in larger size particles.

IV. GAS SEPARATION PROCESSES AND ADSORBENT CONTRACTORS

In another embodiment, a gas separation process is provided herein. The gas separation process comprises contacting a gas mixture containing at least one contaminant with a porous organic composition as described herein, which also is referred to as "adsorbent material" herein.

In various aspects, the gas separation process can be achieved by swing adsorption processes, such as pressure swing adsorption (PSA) and temperature swing adsorption (TSA). All swing adsorption processes have an adsorption step in which a feed mixture (typically in the gas phase) is flowed over an adsorbent that preferentially adsorbs a more readily adsorbed component relative to a less readily adsorbed component. A component may be more readily adsorbed because of kinetic or equilibrium properties of the adsorbent material.

PSA processes rely on the fact that gases under pressure tend to be adsorbed within the pore structure of the adsorbent materials. Typically, the higher the pressure, the greater the amount of targeted gas component that will be adsorbed. When the pressure is reduced, the adsorbed targeted component is typically released, or desorbed. PSA processes can be used to separate gases of a gas mixture, because different gases tend to fill the pores or free volume of the adsorbent to different extents due to either the equilibrium or kinetic properties of the adsorbent. In many important applications, to be described as "equilibrium-controlled" processes, the adsorptive selectivity is primarily based upon differential equilibrium uptake of the first and second components. In another important class of applications, to be described as "kinetic-controlled" processes, the adsorptive selectivity is primarily based upon the differential rates of uptake of the first and second components.

TSA processes also rely on the fact that gases under pressure tend to be adsorbed within the pore structure of the adsorbent materials. When the temperature of the adsorbent is increased, the adsorbed gas is typically released, or desorbed. By cyclically swinging the temperature of adsorbent beds, TSA processes can be used to separate gases in a mixture when used with an adsorbent selective for one or more of the components in a gas mixture. Partial pressure purge displacement (PPSA) swing adsorption processes regenerate the adsorbent with a purge. Rapid cycle (RC) swing adsorption processes complete the adsorption step of a swing adsorption process in a short amount of time. For kinetically selective adsorbents, it can be preferable to use a rapid cycle swing adsorption process. If the cycle time becomes too long, the kinetic selectivity can be lost. These swing adsorption protocols can be performed separately or in combinations. Examples of processes that can be used herein either separately or in combination are PSA, TSA, PTSA, PPSA, PPTSA, RCPSA, RCTSA, RCPPSA and RCPTSA.

Additionally or alternatively, the processes of the present invention can comprise an adsorption step in which the preferentially adsorbed components (target species) of the feed mixture can be adsorbed by the adsorbent material described herein as contained in an adsorbent contactor, such as an adsorbent bed, while recovering the less preferentially adsorbed components at the product end of the adsorbent bed at process pressures. The process pressure represents the pressure at the outlet end of the contactor and can preferably be managed to be no more than 8 bara lower than the feed pressure (as measured at the entrance to the adsorbent bed, i.e., the inlet end of the contactor), e.g., no more than 4 bara lower or no more than 1 bara lower. Additionally or alternatively, the adsorption step of the present invention can be performed at a first temperature from −195° C. to 300° C., particularly from 20° C. to 150° C. or from 30° C. to 120° C. Total feed pressures during the adsorption step can range from 1 bara to 600 bara, e.g., from 2 bara to 200 bara or from 10 bara to 150 bara. It can be preferred to manage the temperature rise from the heat of adsorption during the adsorption step. The system herein can thus be designed so that the heats of adsorption are in the range from 5 to 150 kJ/mol of molecules adsorbed. One method to manage the heat of adsorption can be to incorporate a thermal mass into the adsorption bed to mitigate the temperature rise occurring during the adsorption step. The temperature rise from the heat of adsorption can additionally or alternately be managed in a variety of ways, such as by flowing a cooling fluid through the passages external to the adsorbent bed (i.e., the passages that are used to heat and cool the contactor).

Additionally or alternatively, the passages external to the adsorbent bed can be filled with a fluid that is not flowing during the adsorption process. In this case, the heat capacity of the fluid can serve to mitigate the temperature rise in the adsorbent bed. Combinations of some or all of these heat management strategies can be employed. Even with these heat management strategies, during this step, the final temperature of the bed can typically be slightly higher than the feed inlet temperature. Particularly, the degree of adsorption and cooling can be managed so that the maximum temperature rise at any point within the contactor can be less than 40° C., e.g., less than 20° C., less than 10° C., or less than 5° C. During adsorption, the strongest-adsorbing components can tend to attach most strongly to the adsorbent and can thus be least mobile. Such strongest-adsorbing components can thus tend to occupy regions of adsorbent closest to the inlet and can generally displace weakly adsorbed components from those regions.

Over the period of adsorption, the adsorbates can tend to order themselves from strongest to weakest, moving from inlet to outlet of the adsorption channels of the contactor. In preferred embodiments, the feed gas velocity can be chosen so that a relatively sharp concentration front moves through the contactor, i.e., such that the concentration gradient of adsorbate(s) extends over a relatively short distance, taking into consideration the absolute amplitude of the gradient.

The adsorption step can be stopped at a predetermined point before the adsorption front breaks through the product output end of the adsorbent bed. The adsorption front can move at least 30% of the way down the bed, e.g., at least 50% or at least 80%, before the adsorption step is stopped. Additionally or alternatively, the adsorption step can be conducted for a fixed period of time set by the feed flow rate and adsorbent capacity. Further additionally or alternatively, the adsorption step can be conducted for a time less than 600 seconds, particularly less than 120 seconds, e.g., less than 40 seconds or less than 10 seconds. In some instances, the adsorption front can be allowed to break through the output end only for a short duration (e.g., for at most a few seconds), but usually the adsorption front is not allowed to break through, which can maximize utilization of the bed.

After the adsorption step, the feed gas channels in the contactor can optionally be depressurized to a pressure such that less than 40% of the molecules adsorbed in the contactor desorb (e.g., less than 20% or less than 10%). This pressure can typically be greater than the sum of fugacity of the selectively adsorbed species in the feed.

The feed input end of the adsorbent bed can then be sealed with respect to the passage of a gas, and heat can be externally applied to the adsorbent bed. By "externally heated" it is meant that heat is not applied directly to the adsorbent bed through the flow channels through which the feed gas mixture had flowed and into which the target gas component will be desorbed. The heat can be delivered to the adsorbent bed through a plurality of heating/cooling channels in thermal communication, but not in fluid communication, with the feed gas flow channels of the adsorbent. The adsorbent bed can be externally heated co-currently or counter-currently along its length with respect to the flow of the feed gas mixture, or in a combination of co-current and counter-current heating steps. The flow channels that will carry heating and cooling fluid can be in physical contact with the adsorbent bed to enhance heat transfer. The adsorbent bed can be heated to a second temperature higher than the first temperature used during the adsorption step, the second temperature at least 10° C. higher than the first temperature, e.g., at least 20° C. higher, at least 40° C. higher, or at least 90° C. higher; additionally or alternatively, the second temperature can be from 10° C. to 300° C., e.g., from 20° C. to 200° C. or from 40° C. to 120° C.

During the heating step, the gas pressure in the channel can tend to rise. To improve regeneration at the product end of the bed, during the heating step, the bed can advantageously be slowly purged with clean gas from the clean end (product end) of the adsorbent bed to the point of product recovery. By "clean gas" it is meant that a gas is substantially free of target gas components. For example, if the target gas is an acid gas, then the clean gas will be a stream substantially free of acid gases such as $H_2S$ and/or $CO_2$. In one embodiment, clean gas will contain less than 5 mol % of $H_2S$ and/or $CO_2$, and particularly less than 1 mol % of $H_2S$ and/or $CO_2$. An example of a suitable clean gas would be the product gas itself. When the current invention is utilized for the removal of acid gas from a natural gas stream, in one embodiment, the "clean gas" is comprised of at least one of the hydrocarbon product streams, and in another embodiment is comprised of $C_3$-hydrocarbons, and in another embodiment is comprised of methane. In other embodiments, a separate "clean gas" can be used. In one of these embodiments, the "clean gas" is comprised of nitrogen.

The purge can be introduced at a pressure higher than the pressure in the adsorbent bed. It can be preferred for the total number of moles of purge gas introduced to be less that the number of moles of molecules adsorbed in the contactor, e.g., less than 25% or less that 10% of the number of moles adsorbed. By preventing the adsorption front from breaking through, the product end of the bed can be kept substantially free of the strongly-adsorbed species and can advantageously contain predominantly product species. The isotherms of the adsorbed target component can determine the partial pressure of the preferentially adsorbed component in equilibrium, with the new loading at the higher temperature. This partial pressure can, in some cases, be in excess of 40% greater than the feed pressure, or as much as 70% higher or more. Additionally or alternatively to the recovered sensible heat, a small amount of extra heat may be required to heat the bed to the final predetermined temperature. The isotherm can describe the amount of loading (mmol of adsorbed species per gram of adsorbent) for both chemisorption and physisorption processes.

The external heating can be conducted such that a thermal wave is used to pass heat through the contactor, as it transitions from the adsorption step to the regeneration step, in transitioning from the regeneration to adsorption step, in at least part of the regeneration step, and/or in at least part of the adsorption step. Similarly, it can be preferred to utilize a thermal wave in the cooling step. A thermal wave is a relatively sharp temperature gradient, or front, that can move linearly (i.e., approximately in a single direction within the contactor) during at least one step in the thermal swing adsorption/desorption cycle. The speed at which the thermal front (i.e., region with sharp temperature gradient) can move is referred to as the thermal wave velocity. The thermal wave velocity need not be constant, and the thermal wave direction need not be the same in both adsorption and regeneration steps. For example, the wave can move co-currently, counter-currently, or cross-flow in the adsorption and/or regeneration steps. It is also possible to design a process in which there is no significant thermal wave present in the adsorption step while there is a significant thermal wave in the regeneration step. The presence of a thermal wave in at least some portion of the thermal swing adsorption/regeneration cycle can enable the overall system to achieve a goal of substantially recuperating and recovering the heat required to temperature-swing the adsorbent bed. This, in turn, can improve process efficiency and/or can enable the use of high desorption temperatures that would not normally be considered for TSA operation.

Additionally or alternatively, the contactor is combined with the adsorbent material into a heat exchange structure in a manner that can produce a thermal wave. In Thermal Wave Adsorption (TWA), adsorbent can be placed in one set of heat exchanger channels, while the other set of channels can be used to bring heat into and/or take heat out of the adsorbent device. Fluids and/or gases flowing in the adsorbent and heating/cooling channels do not generally contact each other. The heat adding/removing channels can be designed and operated in a manner that results in a relatively sharp temperature wave in both the adsorbent and in the heating and cooling fluids during the heating and cooling steps in the cycle. An example of a contactor that can produce a relatively sharp thermal wave is a contactor as described herein.

Relatively sharp thermal waves, as used herein, can be expressed in terms of a standard temperature differential over a distance relative to the length of the mass/heat transfer flow in the apparatus. With respect to the mass/heat transfer, we can define a maximum temperature, $T_{max}$, and a minimum temperature, $T_{min}$, as well as convenient temperatures about 10% above $T_{min}$ ($T_{10}$) and about 10% below $T_{max}$ ($T_{90}$). Thermal waves can be said to be relatively sharp when at least the temperature differential of ($T_{90}$-$T_{10}$) occurs over at most 50% (e.g., at most 40%, at most 30%, or at most 25%) of the length of the apparatus that participates in the mass/thermal transfer. Additionally or alternatively, relative sharp thermal waves can be expressed in terms of a maximum Peclet number, Pe, defined to compare axial velocity of the heating/cooling fluid to diffusive thermal transport roughly perpendicular to the direction of fluid flow. Pe can be defined as $(U*L)/\alpha$, where U represents the velocity of the heating/cooling fluid (in m/s), L represents a characteristic distance over which heat is transported (to warm/cool the adsorbent) in a direction roughly perpendicular to the fluid flow, and a represents the effective thermal diffusivity of the contactor (in m2/s) over the distance L. In addition or alternately to the thermal differential over length, thermal waves can be said to be relatively sharp when Pe is less than 10, for example less than 1 or less than 0.1. To minimize time for heating/cooling of the contactor with little or no damage to the flow channel, it can be preferred for U to be in a range from about 0.01 m/s to about 100 m/s, e.g., from about 0.1 m/s to about 50 m/s or from about 1 m/s to about 40 m/s. Additionally or alternatively, to minimize size and energy requirements, it can be preferred for L to be less than 0.1 meter, e.g., less than 0.01 meter or less than 0.001 meter.

Thermal waves in such contactors can be produced when the heating and cooling fluids are flowed co-current or counter-current to the direction of the feed flow in the adsorption step. In many cases, it can be preferred not to have a significant flow of heating or cooling fluids during the adsorption step. A more comprehensive description of Thermal Wave Adsorption (TWA) and other appropriate contactor structures can be found, e.g., in U.S. Pat. No. 7,938,886, which is incorporated herein by reference. This reference shows how to design and operate a contactor to control the sharpness and nature of a thermal wave. A key operational parameter can include the fluid velocity in the contactor. Key design parameters can include the mass of the contactor and heat capacity and thermal conductivity of materials used to form the contactor and heat transfer fluid. An additional key design objective for the contactor can be finding one or more ways to reduce/minimize the distance over which heat has to be transferred, which is why relatively sharp thermal waves can be so desirable.

Additionally or alternatively, during the heating step, the volume of fluid at a temperature no more than 10° C. warmer than the end of the contactor from which it is produced can represent at least 25% (e.g., at least 50% or at least 75%) of the volume of the fluid introduced into the contactor for heating. Similarly, when the present invention is operated to attain a thermal wave, it can be preferred that, during the cooling step, a cold fluid (such as pressurized water) can be flowed into the contactor and a hot fluid near the temperature of the contactor at the end of the recovery step can flow out of the contactor. Most of the recovery step can generally occur after the contactor has been heated. Thus additionally or alternatively during the cooling step, the volume of fluid at a temperature no more than 10° C. colder than the end of the contactor from which it is produced can represent at least 25% (e.g., at least 50% or at least 75%) of the volume of the fluid introduced into the contactor for cooling.

One way to efficiently utilize thermal waves in the apparatuses according to the invention can be for heat recovery. The recovered energy can be used to reduce the energy requirements for heating and cooling of the contactor, for a different contactor of a multitude of contactors needed for a continuous process, and/or for any other purpose. More specifically, energy contained in the hot stream exiting the contactor during the cooling step can be utilized to reduce the energy that must be supplied during the heating step. Similarly, the cold stream exiting the contactor during the heating step can be utilized to reduce the energy that must be supplied to cool fluid to be supplied to the contactor during the cooling step. There are many ways to recoup the energy. For example, the hot thermal fluid flowing out of one contactor can be sent to another with trim heating in between, and/or the cold fluid flowing out of one contactor can be sent to another with trim cooling in between. The thermal fluid flow path between contactors can be determined by valves timed to route thermal fluid between contactors at appropriate points in the overall swing adsorption cycle. In embodiments where thermal fluid flows between contactors, it may also pass through a heat exchanger that adds or removes heat from the flowing thermal fluid and/or pass through a device, such as a compressor, pump, and/or blower, that pressurizes it so it can flow at the desired rate though the contactors. A heat storage medium can be configured so that the energy from the thermal wave moving through one contactor can be stored. A non-limiting example is a tank system that separately stores hot and cold fluids, which can each be fed back into the contactor that produced it and/or to another contactor. In many embodiments, the flow of the thermal fluid through the contactor can be arranged to minimize the mixing of the fluid in the direction of the general flow of the fluid through the contactor and to minimize the effect of the thermal conductivity of the fluid on the sharpness of the temperature wave.

Where energy is recovered, the recovered energy can be used to reduce the amount of sensible heat that must be supplied to heat and cool the contactor. The sensible heat is determined by the heat capacity and temperature rise (or fall) of the contactor. In some embodiments, at least 60% (e.g., at least 80% or at least 95%) of the sensible heat required for heating the contactor is recouped, and/or at least 60% (e.g., at least 80% or at least 95%) of the sensible heat needed to cool the contactor is recouped.

This external heating of the partially sealed adsorbent bed will result in at least a portion of the target species being desorbed from the adsorbent bed. It can also result in an increase in pressure of the resulting target species component stream. At least a portion of the desorbed target species component is recovered at pressures higher than that at the initiation of the heating step. That is, recovery of target gas will take place toward the end of the heating step with minimum or no depressurization of the adsorbent bed. It is preferred that the pressure be a least 2 bar, particularly at least 5 bar higher than that at the initiation of the heating step.

The pressure in the adsorbent bed is then reduced, particularly in a series of blow-down steps in a co-current or counter-current and can be performed with or without a purge gas stream to the final target gas recovery pressure. Pressure reduction can occur in less than 8 steps, particularly in less than 4 steps, with target species being recovered in each step. In one embodiment, the pressure is decreased by a factor of approximately three in each step. It is also preferred that the depressurization be conducted counter-currently and that during the depressurizing step a purge gas be passed counter-current (from product end to feed end) through the adsorbent bed. It is also preferred that the purge gas be a so-called clean gas as previously described.

In another embodiment, in any step, other than the adsorption step, the clean gas is conducted counter-currently through the adsorbent bed to ensure that the end of the bed is substantially free of target species. In another embodiment, the clean gas is conducted counter-currently through the adsorbent bed in at least a portion of the desorption steps. An effective rate of counter-current flowing clean gas is preferred during these step(s) to overcome mass diffusion to ensure that the product end of the bed is kept substantially free of the target species.

After the target gas has been recovered, the adsorbent bed can be cooled and repressurized. One can cool the bed before repressurization. The adsorbent bed can be cooled, particularly to a temperature that is no more than 40° C. above the temperature of feed gas mixture, e.g., no more than 20° C. above or no more than 10° C. above. Additionally or alternatively, the adsorbent bed can be cooled by external cooling in a co-current or counter-current manner, such that a thermal wave can pass through the bed. In some such embodiments, the first part of the adsorbent bed can be cooled then repressurized. In certain of those embodiments, less than 90% of the length of adsorption bed can be cooled, e.g., less than 50%. The adsorbent bed can additionally or alternatively be purged with a clean gas during cooling.

The adsorbent bed can then be repressurized, during and/or after the cooling step, e.g., using clean product gas or counter-currently with blow-down gas from another bed after a first stage of repressurization. The final pressure of the repressurization step can be substantially equal to the pressure of the incoming feed gas mixture.

Additionally or alternatively, $CO_2$ can be removed from a feed gas mixture in the swing adsorption process. Thus, in one embodiment a process for selectively separating $CO_2$ from a feed gas mixture is provided. The process comprising: a) contacting the feed gas mixture under sorption conditions with the adsorbent material described herein; b) sorbing the $CO_2$ into/onto the sorbent; c) subjecting the sorbent to desorption conditions by which at least a portion of the sorbed $CO_2$ is desorbed; and d) retrieving a $CO_2$-rich product stream that has a higher mol % of $CO_2$ than the feed gas mixture. The gas mixture can comprise $CH_4$, such as but not limited to natural gas or gas associated with the production of oil. A gas mixture comprising $CH_4$ can contain significant levels of contaminants such as $H_2O$, $H_2S$, $CO_2$, $N_2$, mercaptans, and/or heavy hydrocarbons.

The kinetic selectivity and diffusivity of the of the adsorbent material can allow $CO_2$ to be rapidly transmitted into the core while hindering the transport of $CH_4$, so that it is possible to selectively separate $CO_2$ from a mixture of $CO_2$ and $CH_4$.

Additionally or alternatively, nitrogen may desirably be removed from natural gas or gas associated with the production of oil to obtain high recovery of a purified methane product from nitrogen containing gas.

Additionally or alternatively, $H_2S$ may desirably be removed from natural gas or gas associated with the production of oil to obtain high recovery of a purified methane product from $H_2S$ containing gas.

Additionally or alternatively, $H_2$ may desirably be removed from natural gas or gas associated with the production of oil to obtain high recovery of a purified methane product from $H_2$ containing gas.

Additionally or alternatively, Xe or Kr may desirably be removed from nuclear reactor atmospheres to prevent Xe or Kr from being released into the environment. For example, unstable, hazardous, radioisotopes of krypton and xenon, such as $^{85}Kr$ and $^{133}Xe$, may be produced in nuclear fission and can enter the atmosphere during the reprocessing of spent nuclear fuel, or via nuclear accidents. Thus, removal and separation of radioactive Xe and/or Kr is necessary.

Additionally or alternatively, the gas mixture can comprise $NO_x$ and/or $SO_x$ species as contaminants, such as a waste gas stream, a flue gas stream and a wet gas stream. As used herein, the terms "$NO_x$," and "$NO_x$" species refers to the various oxides of nitrogen that may be present in waste gas, such as waste gas from combustion processes. The terms refer to all of the various oxides of nitrogen including, but not limited to, nitric oxide (NO), nitrogen dioxide ($NO_2$), nitrogen peroxide ($N_2O$), nitrogen pentoxide ($N_2O_5$), and mixtures thereof. As used herein, the terms "$SO_x$," and "$SO_x$ species," refers to the various oxides of sulfur that may be present in waste gas, such as waste gas from combustion processes. The terms refer to all of the various oxides of sulfur including, but not limited to, SO, $SO_2$, $SO_3$, $SO_4$, $S_7O_2$, and $S_6O_2$. Thus, it can be desirable to remove $NO_x$ and/or $SO_x$ species.

Thus, examples of contaminants include, but are not limited to $H_2O$, $H_2S$, $H_2$, $CO_2$, $N_2$, Xe, Kr, mercaptans, heavy hydrocarbons, $NO_x$, and/or $SO_x$ species.

Additionally or alternatively, an adsorbent contactor for use in the swing adsorption gas separation processes described herein is provided. The adsorbent contactor comprises a) a gas inlet end; and b) a gas outlet end; wherein the gas inlet end and the gas outlet end are in fluid connection by a plurality of open flow channels wherein the surface of the open flow channels are comprised of the porous organic composition (adsorbent material) described herein.

The adsorbent contactor can be in the form of open flow channels, e.g., parallel channel connectors, in which the majority of the open pore volume is attributable to microporous pore diameters, e.g., in which less than 40%, particularly less than 20%, for example less than 15%, or less than 10%, of its open pore volume can originate from pore diameters greater than 20 angstroms (and less than about 1 micron; i.e., from mesoporous and macroporous pore diameters).

A flow channel is described herein as that portion of the contactor in which gas flows if a steady state pressure difference is applied between the point/place at which a feed stream enters the contactor and the point/place a product stream leaves the contactor. By "open pore volume" herein, it is meant all of the open pore space not occupied in the volume encompassed by the adsorbent material. The open pore volume includes all open spaces in the volume encompassed by the adsorbent material, including but not limited to all volumes within the adsorbent materials themselves, including the pore volume of the structured or amorphous materials, as well as any interstitial open volumes within the structure of the portion of the bed containing the adsorbent material. Open pore volume, as used herein, does not include spaces not accompanied by the adsorbent material such as open volumes in the vessel for entry, exit, or distribution of gases (such as nozzles or distributor areas), open flow channels, and/or volumes occupied by filler materials and/or solid heat adsorption materials. "Parallel channel contactors" are defined herein as a subset of adsorbent contactors comprising structured (engineered) adsorbents in which substantially parallel flow channels are incorporated into the adsorbent structure (typically the adsorbents can be incorporated onto/into the walls of such flow channels). Non-limiting examples of geometric shapes of parallel channel contactors can include various shaped monoliths having a plurality of substantially parallel channels extending from one end of the monolith to the other; a plurality of tubular members, stacked layers of adsorbent sheets with and without spacers between each sheet; multi-layered spiral rolls; spiral wound adsorbent sheets; bundles of hollow fibers; as well as bundles of substantially parallel solid fibers; and combinations thereof. Parallel flow channels are described in detail, e.g., in U.S. Patent Application Publication Nos. 2008/0282892 and 2008/0282886, both of which are incorporated herein by reference. These flow channels can be formed by a variety of ways, and, in addition to the adsorbent material, the adsorbent contactor structure may contain items such as, but not limited to, support materials, heat sink materials, void reduction components, and heating/cooling passages.

It can be desirable to operate with a multiplicity of contactor units, with several coupled in a heating/cooling operation and others involved in adsorption (and/or desorption). In such an operation, the contactor can be substantially cooled by a circulating heat transfer medium before it is switched into service for adsorption. One advantage of such an operation can be that the thermal energy used to swing the bed is retained in the heat transfer medium. If adsorption were to proceed simultaneously with cooling, then a substantial part of the heat in the bed could be lost to the adsorbate-free feed, and a higher heat load could be needed to restore the high temperature of the heat transfer medium.

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses, and systems may be used to prepare natural gas products by removing contaminants. The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), thermal swing adsorption (TSA), and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;

(b) removing acid gas with RC-TSA using advanced cycles and purges as described in U.S. Provisional Application No. 61/447,858, filed Mar. 1, 2011, as well as the U.S. patent application bearing docket number 2011EM060-US2, claiming priority thereto, which are together incorporated by reference herein in their entirety;

(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;

(d) depressurizing one or more RC-TSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(e) using exhaust or recycle streams to minimize processing and hydrocarbon losses, such as using exhaust streams from one or more RC-TSA units as fuel gas instead of re-injecting or venting;

(f) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-TSA units with minimal purge flow rates;

(g) using feed compression before one or more RC-TSA units to achieve a desired product purity;

(h) contemporaneous removal of non-acid gas contaminants such as mercaptans, COS, and BTEX; selection processes and materials to accomplish the same;

(i) using structured adsorbents for gas-solid contactors to minimize pressure drop compared to conventional packed beds;

(j) selecting a cycle time and cycle steps based on adsorbent material kinetics; and (k) using a process and apparatus that uses, among other equipment, two RC-TSA units in series, wherein the first RC-TSA unit cleans a feed stream down to a desired product purity and the second RC-TSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD. Ranges expressly disclosed include any combination of the above-enumerated rates, e.g., 15 to 500 MSCFD, 50 to 100 MSCFD, or 25 to 50 MSCFD, etc.

V. FURTHER EMBODIMENTS

The invention can additionally or alternatively include one or more of the following embodiments.

Embodiment 1

A non-metallic porous organic composition comprising: a core comprising nitrogen-containing molecules; and a shell comprising nitrogen-containing molecules disposed around the core; wherein the shell is non-chemically bonded to the core; and wherein at least one of the core nitrogen-containing molecules is different from at least one of the shell nitrogen-containing molecules.

Embodiment 2

The composition of embodiment 1, wherein the nitrogen-containing molecules comprise one or more moieties selected from the group consisting of:

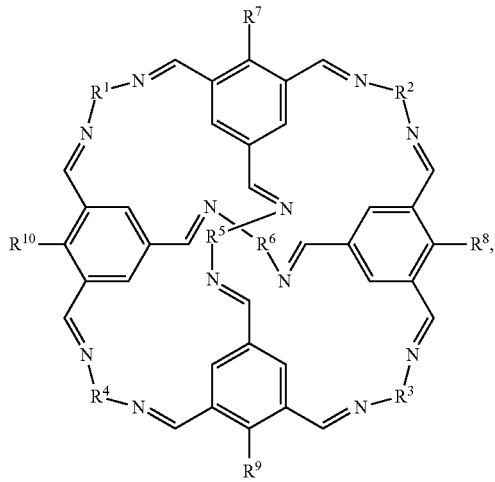

I

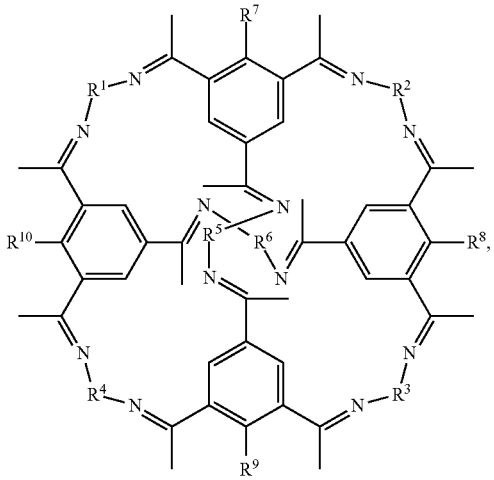

II

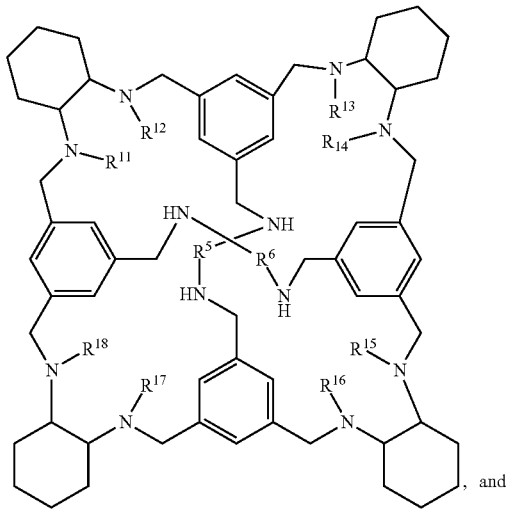

III, and

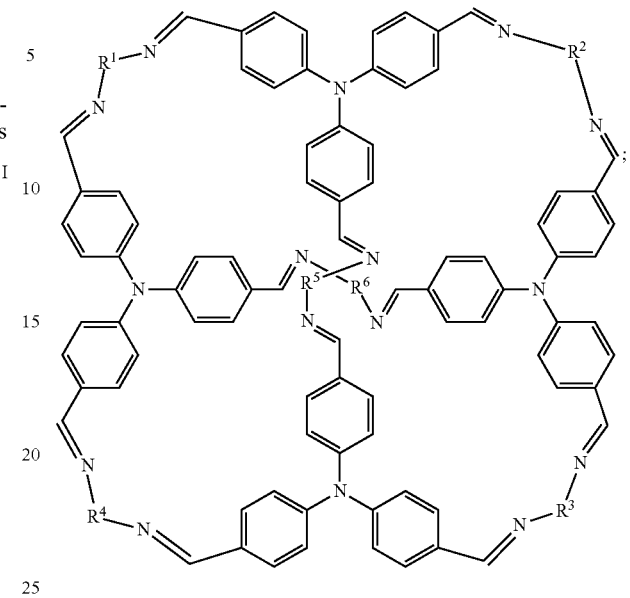

IV wherein:
$R^1$, $R^2$, R, $R^4$, $R^5$, and $R^6$ are each independently

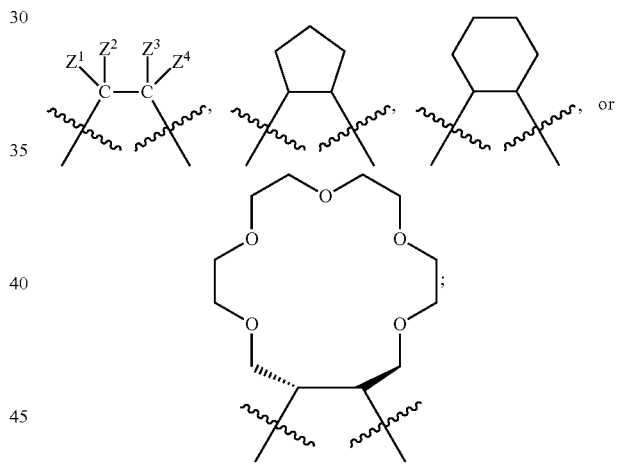

wherein $Z^1$, $Z^2$, $Z^3$, and $Z^4$ are each independently hydrogen, a $C_1$-$C_4$ alkyl or an optionally substituted aromatic group; $R^7$, $R^8$, $R^9$, and $R^{10}$ are each independently hydrogen or a hydroxyl; and
$R^{11}$, $R^{12}$, $R^{13}$, $R^{14}$, $R^5$, $R^{16}$, $R^7$, and $R^{18}$ are each independently hydrogen or one or more of $R^{11}$ and $R^{12}$, $R^{13}$ and $R^{14}$, $R^{15}$ and $R^{16}$, or $R^7$ and $R^{18}$ are bonded to an optionally substituted $C_1$-$C_4$ alkylene.

Embodiment 3

The composition of embodiment 2, wherein $R^1$, $R^2$, $R^3$, $R^4$, $R^5$, and $R^6$ are the same.

Embodiment 4

The composition of any one of embodiments 2 or 3, wherein $Z^1$, $Z^2$, $Z^3$, and $Z^4$ are each independently hydrogen, a $C_1$-$C_2$ alkyl or a phenyl group.

Embodiment 5

The composition of any one of embodiments 2 to 4, wherein $R^1$, $R^2$, $R^3$, $R^4$, $R^5$, and $R^6$ are each independently

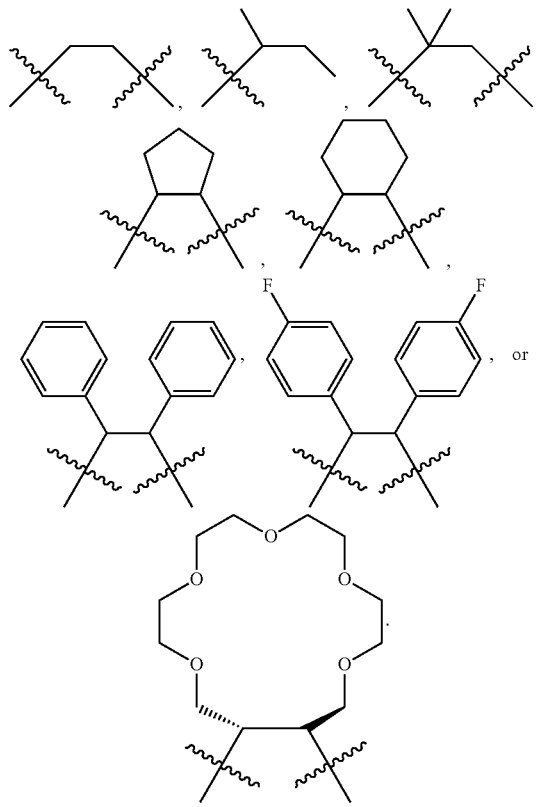

Embodiment 6

The composition of any one of embodiments 2 to 5, wherein R, $R^8$, $R^9$, and $R^{10}$ are the same.

Embodiment 7

The composition of any one of embodiments 2 to 6, wherein one or more of $R^{11}$ and $R^{12}$, $R^{13}$ and $R^{14}$, $R^{15}$ and $R^{16}$, or $R^{17}$ and $R^{18}$ is are bonded to an optionally substituted $C_1$-$C_2$ alkylene.

Embodiment 8

The composition of embodiment 2, wherein the nitrogen-containing molecules comprise moieties corresponding in structure to moiety (I) or moiety (II), wherein $R^7$, $R^8$, $R^9$, and $R^{10}$ are each hydrogen.

Embodiment 9

The composition of embodiment 2, wherein the nitrogen-containing molecules comprise a moiety corresponding in structure to moiety (I), wherein $R^7$, $R^8$, $R^9$, and $R^{10}$ are each hydroxyl.

Embodiment 10

The composition of embodiment 2, wherein the nitrogen-containing molecules comprise moieties corresponding in structure to moiety (II) or moiety (IV), wherein $R^1$, $R^2$, $R^3$, $R^4$, $R^5$, and $R^6$ are each independently

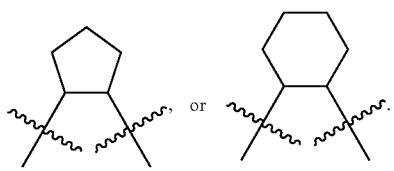 [SMILES: *C1CCCC1* ; *C1CCCCC1*]

Embodiment 11

The composition of embodiment 2, wherein the nitrogen-containing molecules comprise moieties corresponding in structure to moiety (III), wherein $R^5$ and $R^6$ are

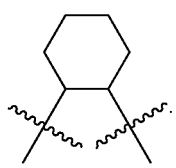

Embodiment 12

The composition of any one of the previous embodiments, wherein the nitrogen-containing molecules are selected from the group consisting of CC1, CC2, CC3, CC4, CC7, CC8, CC9, CC10, CC13, CC15, CC16, RCC3, AT-RCC3, TRCC3, TCC1, TCC2, TCC3, crown ether and a combination thereof.

Embodiment 13

The composition of any one of the previous embodiments, wherein the core and/or the shell comprise a combination of nitrogen-containing molecules.

Embodiment 14

The composition of any one of the previous embodiments, wherein the nitrogen-containing molecules comprise the R enantiomer, the S enantiomer, or racemate.

Embodiment 15

The composition of any one of the previous embodiments, wherein the core comprises racemic CC3 and the shell comprises racemic CC16; the core comprises racemic CC16 and the shell comprises racemic CC3; the core comprises racemic CC3 and the shell comprises racemic CC15; or the core comprises racemic CC15 and the shell comprises racemic CC3.

Embodiment 16

The composition of any one of the previous embodiments, wherein the shell and/or core/shell interface has substantially no cracks.

Embodiment 17

The composition of any one of the previous embodiments, wherein the composition has an adsorptive loading ratio for $CO_2$ over $CH_4$ of greater than or equal to 1.2.

Embodiment 18

The composition of any one of the previous embodiments, wherein the nitrogen-containing molecules have an octahedral, spherical, or tetragonal shape.

Embodiment 19

The composition of any one of the previous embodiments, wherein the composition is in the form of particles having an average particle diameter from about 10 nm to about 10000 µm.

Embodiment 20

The composition of any one of the previous embodiments, wherein the core and the shell core are present in a weight ratio of core to shell of about 1:10 to about 1:2.

Embodiment 21

A method of making the composition of any one of the previous embodiments, the method comprising sequentially adding a solution of the nitrogen-containing molecules and a solvent to the core molecules to create a product; and evaporating the product to obtain the composition of any one of the previous embodiments.

Embodiment 22

A gas separation process comprising contacting a gas mixture containing at least one contaminant (e.g., $N_2$, $H_2$, $CO_2$, $CH_4$, Xe or Kr) with the composition of claim of any one of embodiments 1 to 10.

Embodiment 23

The process of embodiment 22, wherein the process comprises PSA, TSA, PPSA, PTSA, RCPSA, RCTSA, RC-PPSA or RC-PTSA.

EXAMPLES

General Methods
NMR
Solution $^1H$ NMR spectra were recorded in deuterated chloroform at 400.13 MHz using a Bruker Avance 400 NMR spectrometer.
Scanning Electron Microscopy
Imaging of the crystal morphology was achieved using a Hitachi S-4800 cold field emission scanning electron microscope (FE-SEM) operating in both scanning and transmission modes. Scanning-mode samples were prepared by depositing dry crystals on 15 mm Hitachi M4 aluminum stubs using an adhesive high-purity carbon tab before coating with a 2 nm layer of gold using an Emitech K550X automated sputter coater. Imaging was conducted at a working distance of 8 mm and a working voltage of 3 kV using a mix of upper and lower secondary electron detectors. Transmission-mode samples were prepared by dispersing the cage particles in a methanol suspension and depositing onto carbon-coated copper grids (300 mesh), imaging at 30 kV working voltage and 7 mm distance.
Dynamic Light Scattering
Analysis was performed directly on the mixed cage solutions in DCM or $CHCl_3$ using quartz vials and a Malvern Instruments Zetasizer nano series.
Gas Sorption Analysis
Surface areas were measured by nitrogen adsorption and desorption at 77.3 K. Powder samples were degassed offline at 100° C. for 15 h under dynamic vacuum before analysis, followed by degassing on the analysis port under vacuum, also at 100° C. Isotherms were measured using a Micromeritics 2020 or 2420 volumetric adsorption analyzer.

Example 1—Synthesis of Shell and/or Core Molecules

Example 1a: Synthesis of CC3-R

CC3-R was synthesized by a condensation reaction of 1,3,5-triformylbenzene (TFB) (obtained from Manchester Organics) with (R,R)-1,2-diaminocyclohexane (R,R-CHDA) (obtained from TCI-UK) in dichloromethane (DCM) (obtained from Fisher) at room temperature (~15-25° C.). TFB (400 mg, 2.47 mmol) was dissolved in DCM (20 ml) and added to a solution of R,R-CHDA (422 mg, 3.70 mmol) in DCM (20 ml). After 5-7 days, crystals were formed and isolated to obtain white powder.

Example 1b: Synthesis of CC3-S

CC3-S was synthesized according to Example 1a except for the use of the (S,S)-1,2-diaminocyclohexane (S,S-CHDA) (obtained from TCI-UK) instead of R,R-CHDA.

Example 1c: Synthesis of CC16-R

CC16-R was synthesized by adding DCM (50 mL) (obtained from Fisher) to 2-hydroxy-1,3,5-benzenetricarbaldehyde (50 mg, 0.31 mmol) (obtained from Key Organics Ltd.) in a round bottle at room temperature (~15-25° C.). After 5 minutes, a solution of R,R-CHDA (34 mg, 0.47 mmol) (obtained from TCI-UK) in MeOH (5 mL) (obtained from Fisher) was added. The resulting mixture was left covered for 3-5 days with stirring. CC16-R as a yellow powder was obtained by slow evaporation with a yield of 87%. The crystals were obtained by dissolving the CC16-R powder in chloroform solution and the crystals were isolated over several days.

Example 1d: Synthesis of CC16-S

CC16-S was synthesized according to Example 1c except for the use of the S,S-CHDA (obtained from TCI-UK) instead of R,R-CHDA.

Example 1e: Synthesis of CC15-S

CC15-S was synthesized by adding a solution of S,S-CHDA (4.28 g, 37.5 mmol, 1.5 eq) (obtained from TCI-UK) in DCM (50 mL) (obtained from Fisher) to triacetylbenzene (5.10 g, 25.0 mmol, 1 eq) (obtained from Fisher) and molecular sieves (1 g, 3 Å), which resulted in a yellow suspension in a flask. The flask was equipped with a reverse Dean-Stark apparatus, which was charged with DCM, and the solution was heated to 45° C. with stirring for 24 h. Approximately 0.7 mL of water was observed to have collected in the Dean-Stark apparatus. The reaction was then cooled to room temperature (~15-25° C.) and filtered by gravity to remove the molecular sieves. The resulting pale yellow solution was evaporated to yield a pale yellow solid (7.36 g, 92% crude yield) which was recrystallized from DCM/hexane (1:1) to yield white needle-like crystals of CC15-S.

Example 2—Synthesis of Core/Shell Cases

Example 2a: Synthesis of Samples 1 and 1a (CC3-$RS_{core}$/CC16-$RS_{shell}$)

A. Sample 1

One equivalent CC3-R DCM solution (2 mg/ml, 1 ml) was prepared, and 1 equivalent of CC3-S DCM solution (2 mg/ml, 1 ml) was added into the CC3-R DCM solution using a syringe pump with a rate of mixing of 2.5 ml/h. The mixed solution was left over 4 h to form core co-crystals. Sequentially, 1 equivalent CC16-R DCM solution (2.1 mg/ml, 1 ml) and 1 equivalent of CC16-S (2.1 mg/ml, 1 ml) were added using the syringe pump to form shell co-crystals The preparation was carried out at 30° C. The solvents were slowly evaporated (sample vials were covered with parafilm with small holes for solvent evaporation) from the as-prepared solution to obtain the particles of a Sample 1 shell/core cage where CC3-RS co-crystals formed the core and CC16-RS co-crystals formed the shell (i.e., CC3-$RS_{core}$/CC16-$RS_{shell}$). A schematic of co-crystals forming the core and co-crystals forming the shell, such as Sample 1, is shown in FIG. 1a.

The average particle size (diameter) of Sample 1 was determined to be 1 μm via dynamic light scattering (DLS).

B. Sample 1a

Figure 1B:
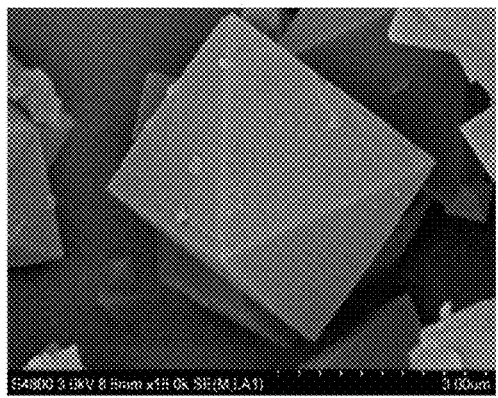
Figure 1C:
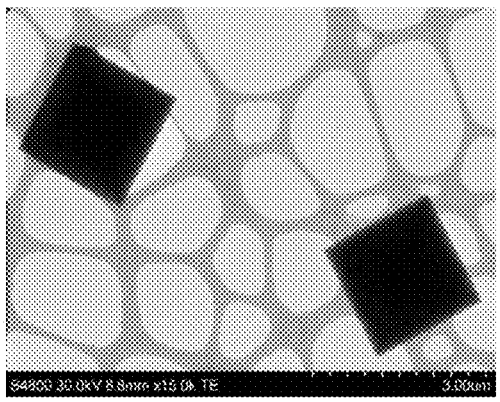
Figure 1D:
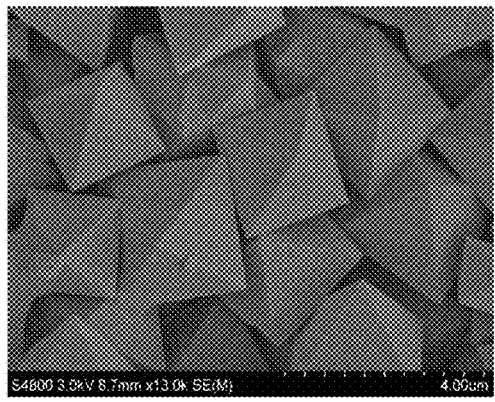

Larger crystals were required in order to enable determination of the internal structure and therefore a method was developed to do so. One equivalent CC3-R $CHCl_3$ solution (8 mg/ml, 1 ml) was prepared, and 1 equivalent of CC3-S $CHCl_3$ solution (8 mg/ml, 1 ml) was added into the CC3-R solution using the syringe pump with a rate of mixing of 2.5 ml/h. The mixed solution was left over 4 h to form core-cocrystals. Sequentially, 1 equivalent CC16-R $CHCl_3$ solution (8.4 mg/ml, 1 ml) and 1 equivalent of CC16-S (8.4 mg/ml, 1 ml) were added using the syringe pump to form shell-cocrystals. The preparation was carried out at 50° C. Via filtration particles were obtained of Sample 1a shell/core cage where CC3-RS co-crystals formed the core and CC16-RS co-crystals formed the shell (i.e., CC3-$RS_{core}$/CC16-$RS_{shell}$) The average particle size (diameter) of Sample 1a was determined to be 3 μm, as measured by scanning electron microscope (SEM). Sample 1a particles are shown in the SEM images in FIGS. 1b-1d. The layered structure of the shell can be seen in FIG. 1b. Sample 1a showed uniform octahedral shape crystals without aggregation during the formation of the second layer in SEM.

Example 2b: Synthesis of Sample 2 (CC16-$RS_{core}$/CC3-$RS_{shell}$)

A. Sample 2

One equivalent CC16-R DCM solution (2 mg/ml, 1 ml) was prepared, and 1 equivalent of CC16-S DCM solution (2 mg/ml, 1 ml) was added into the CC16-R DCM solution using a syringe pump with a rate of mixing of 5 ml/h. The mixed solution was left over 4 h to form core co-crystals. Sequentially, 1 equivalent CC3-R DCM solution (2.1 mg/ml, 1 ml) and 1 equivalent of CC3-S (2.1 mg/ml, 1 ml) were added using the syringe pump to form shell co-crystals The preparation was carried out at 30° C. The solvents were slowly evaporated from the as-prepared solution to obtain the particles of a Sample 2 shell/core cage where CC16-RS co-crystals formed the core and CC3-RS co-crystals formed the shell (i.e., CC16-$RS_{core}$/CC3-$RS_{shell}$). The average particle size of Sample 2 was determined to be 721 nm via DLS.

B. Sample 2a

One equivalent CC3-R DCM solution (2 mg/ml, 1 ml) was prepared, and 1 equivalent of CC3-S DCM solution (2 mg/ml, 1 ml) was added into the CC3-R solution using the syringe pump. The mixed solution was left over 4 h to form core-cocrystals. Sequentially, 1 equivalent CC16-R DCM solution (2.1 mg/ml, 1 ml) and 1 equivalent of CC16-S (2.1 mg/ml, 1 ml) were added using the syringe pump to form shell-cocrystals The preparation was carried out at 30° C. The as-prepared solution was slowly evaporated to remove solvents to obtain the particles of Sample 2a shell/core cage where CC16-RS co-crystals formed the core and CC3-RS co-crystals formed the shell (i.e., CC16-$RS_{core}$/CC3-$RS_{shell}$). The average particle size of Sample 2a was determined to be 3 μm.

Example 2c: Synthesis of Sample 3 (CC3-$RS_{core}$/CC15-S-CC3-$R_{shell}$)

A. Sample 3

One equivalent CC3-R DCM solution (5 mg/ml, 1 ml) was prepared, and 1 equivalent of CC3-S DCM solution (5 mg/ml, 1 ml) was added into the CC3-R solution using the syringe pump with a rate of mixing of 2.5 ml/h. The mixed solution was left over 4 h to form core-cocrystals. Sequentially, 1 equivalent CC3-R DCM solution (5 mg/ml, 1 ml) and 1 equivalent of CC15-S (5.7 mg/ml, 1 ml) were added using the syringe pump to form shell-cocrystals. The preparation was carried out at the room temperature. The as-prepared solution was slowly evaporated to remove solvents to obtain the particles of Sample 3 shell/core cage where CC3-RS co-crystals formed the core and CC15-S and CC3-R co-crystals formed the shell (i.e., CC3-$RS_{core}$/CC15-S-CC3-$R_{shell}$). The average particle size of Sample 3 was determined to be 400 nm.

B. Sample 3a 1 equivalent CC3-R $CHCl_3$ solution (5 mg/ml, 1 ml) was prepared, and 1 equivalent of CC3-S $CHCl_3$ solution (5 mg/ml, 1 ml) was added into the CC3-R solution using the syringe pump with a rate of mixing of 2.5 ml/h. The mixed the solution was left over 4 h to form core-cocrystals. Sequentially, 1 equivalent CC3-R $CHCl_3$ solution (5 mg/ml, 1 ml) and 1 equivalent of CC15-S (5.7 mg/ml, 1 ml) were added using the syringe pump to form shell-cocrystals The preparation was carried out at 50° C. Via filtration particles was obtained of Sample 3a shell/core cage where CC3-RS co-crystals formed the core and CC15-S and CC3-R co-crystals formed the shell (i.e., CC3-$RS_{core}$/CC15-S-CC3-$R_{shell}$). The average particle size of Sample 3a was determined to be 3 μm.

Example 3—Confocal Laser Scanning Microscopy (CLSM) Analysis

Figure 2A:
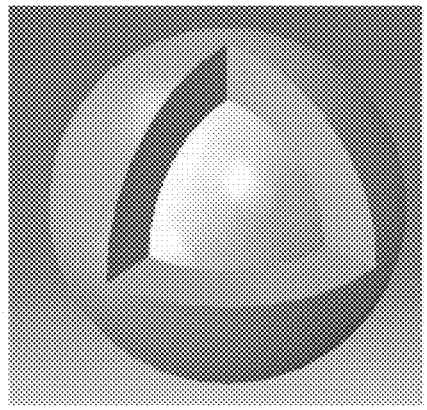
FIG. 2a illustrates a schematic showing a CC3-RS$_{core}$/CC16-RS$_{shell}$ structure with a non-fluorescent core and a fluorescent shell.
Figure 2B:
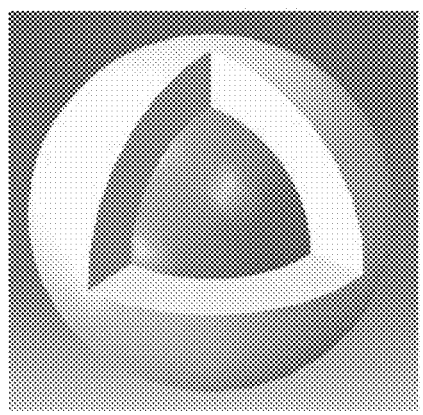
FIG. 2b illustrates a schematic showing a CC16-RS$_{core}$/CC3-RS$_{shell}$ structure with a fluorescent core and a non-fluorescent shell.

Unlike CC3 crystals, CC16 crystals are fluorescent. A schematic showing a CC3-$RS_{core}$/CC16-$RS_{shell}$ structure with a non-fluorescent core and a fluorescent shell is shown in FIG. 2a, a schematic showing a CC16-$RS_{core}$/CC3-$RS_{shell}$ structure with a fluorescent core and a non-fluorescent shell is shown in FIG. 2b.

Figure 2C:
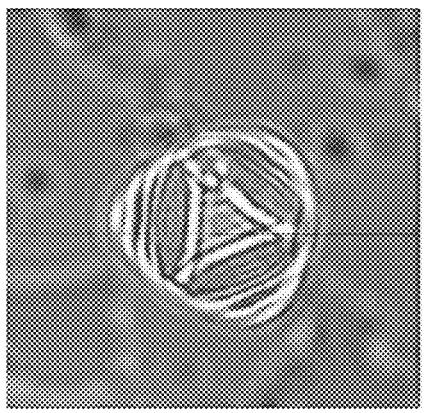
FIGS. 2c and 2d illustrate confocal laser scanning microscopy (CLSM) images for CC3-RS$_{core}$/CC16-RS$_{shell}$ and CC16-RS$_{core}$/CC3-RS$_{shell}$, respectively.
Figure 2D:
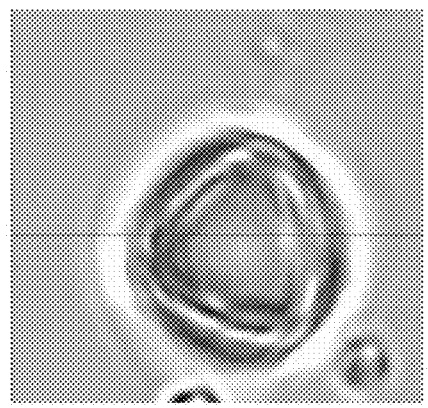
Figure 2E:
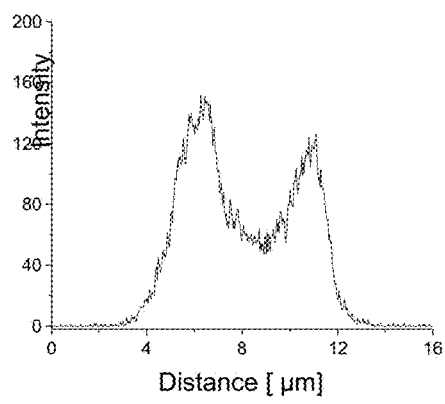
FIGS. 2e and 2f illustrate fluorescent intensity profiles for CC3-RS$_{core}$/CC16-RS$_{shell}$ and CC16-RS$_{core}$/CC3-RS$_{shell}$, respectively.
Figure 2F:
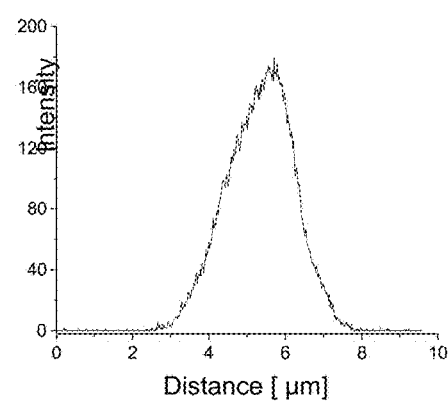

To further visualize the layered core/shell structure, ~5 micrometer sized cage core/shell crystals were used and analyzed with CLSM. The ~5 micrometer sized cage core/shell crystals were made similarly to the 3 micrometer sized crystals (Samples 1a and 2a) except a slower evaporation time was used to make the larger crystals. The horizontally sliced confocal image of CC3-RS$_{core}$/CC16-RS$_{shell}$ revealed that the non-fluorescent inner core (CC3-RS) was covered by the fluorescent outer shell layer (CC16-RS) as shown in FIG. 2c. In contrast, the CC16-RS$_{core}$/CC3-RS$_{shell}$ crystals retain low fluorescent intensities due the non-fluorescent shell. As shown in FIG. 2d, the center of the CC16-RS$_{core}$/CC3-RS$_{shell}$ crystal was fluorescent, and no emissions were observed in the outer layer. The intensity profiles for CC3-RS$_{core}$/CC16-RS$_{shell}$ and CC16-RS$_{core}$/CC3-RS$_{shell}$ crystals are presented in FIGS. 2e and 2f, respectively, which correspond to the core/shell crystals shown in the horizontally sliced images of FIGS. 2c and 2d. The inner core and outer shell can be distinguished by the fluorescent intensity. The distance across the crystal was ~6 microns for CC3-RS$_{core}$/CC16-RS$_{shell}$, comprising ~3 microns non-fluorescent core calculated from the intensity profiles. The size of CC16-RS$_{core}$/CC3-RS$_{shell}$ crystal was ~4 microns with ~3 microns fluorescent core.

Example 4—Porosity Analysis and Light Gas Sorption Studies

Gas sorption analysis was carried out for core/shell crystals and cocrystals made of the core and shell materials individually. $N_2$ sorption measurements at 77 K showed Type I isotherms for all samples. The surface areas and capacities are shown in Table 3 below.

TABLE 3

| | SA$_{BET}$ (m$^2$ g$^{-1}$) | N$_2$ (mmol g$^{-1}$) 77K | H$_2$ (mmol g$^{-1}$) 77K | Xe (mmol g$^{-1}$) 273K | Kr (mmol g$^{-1}$) 273K | CO$_2$ (mmol g$^{-1}$) 273K | CH$_4$ (mmol g$^{-1}$) 273K |
|---|---|---|---|---|---|---|---|
| CC3-RS | 598 | 9.55 | 5.87 | 3.53 | 1.71 | | |
| CC16-RS | 500 | 8.07 | 5.65 | 3.17 | 1.67 | | |
| CC3-R | 409 | 4.50 | 5.00 | 2.60 | 1.52 | 2.01 | 1.85 |
| CC16-R | 514 | 7.25 | | | | 2.75 | 1.72 |
| Sample 1 (CC3-RS$_{core}$/CC16-RS$_{shell}$-1 um) | 535 | 9.82 | 5.46 | 3.11 | 1.58 | | |
| Sample 1a (CC3-RS$_{core}$/CC16-RS$_{shell}$-3 um) | 539 | 8.54 | 5.70 | 3.36 | 1.70 | 2.27 | 0.142 |
| Sample 2 (CC16-RS$_{core}$/CC3-RS$_{shell}$-1 um) | 543 | 9.08 | 5.52 | 3.20 | 1.59 | | |
| Sample 2a (CC16-RS$_{core}$/CC3-RS$_{shell}$-3 um) | 523 | 8.52 | 5.78 | 3.34 | 1.71 | 2.55 | 1.57 |

Figure 3:
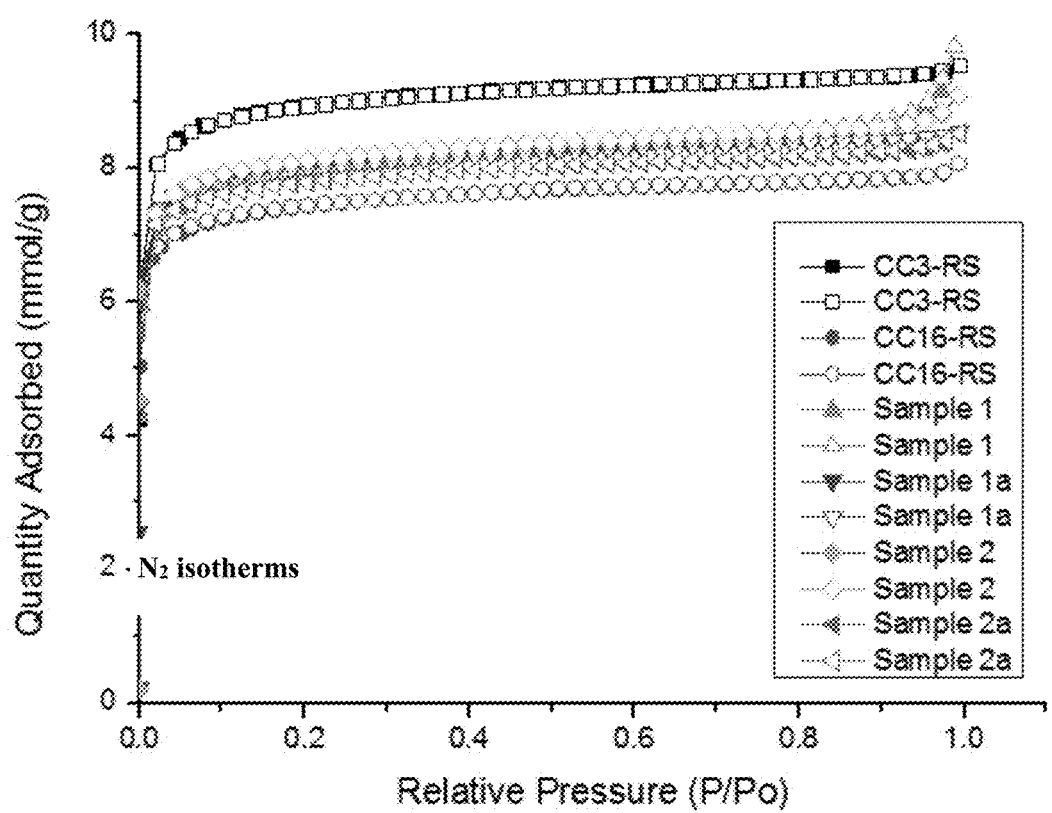
FIG. 3 illustrates $N_2$ isotherms for CC3-RS, CC16-RS, Sample 1, Sample 1a, Sample 2 and Sample 2a. Filled and open symbols represent adsorption and desorption, respectively.

The surface areas for Sample 1a (CC3-RS$_{core}$/CC16-RS$_{shell}$) and Sample 2a (CC16-RS$_{core}$/CC3-RS$_{shell}$) are 539, and 523 m$^2$ g$^{-1}$, respectively, as compared to the BET surface areas of 598 m$^2$ g$^{-1}$ for CC3-RS, and 500 m$^2$ g$^{-1}$ for CC16-RS. Total N$_2$ uptakes for Sample 1a (CC3-RS$_{core}$/CC16-RS$_{shell}$), Sample 2a (CC16-RS$_{core}$/CC3-RS$_{shell}$), CC3-RS and CC16-RS and was 8.54, 8.52, 9.55 and 8.07 mmol g$^{-1}$ at 1 bar and 77.3 K, respectively, as shown in FIG. 3.

Figure 4:
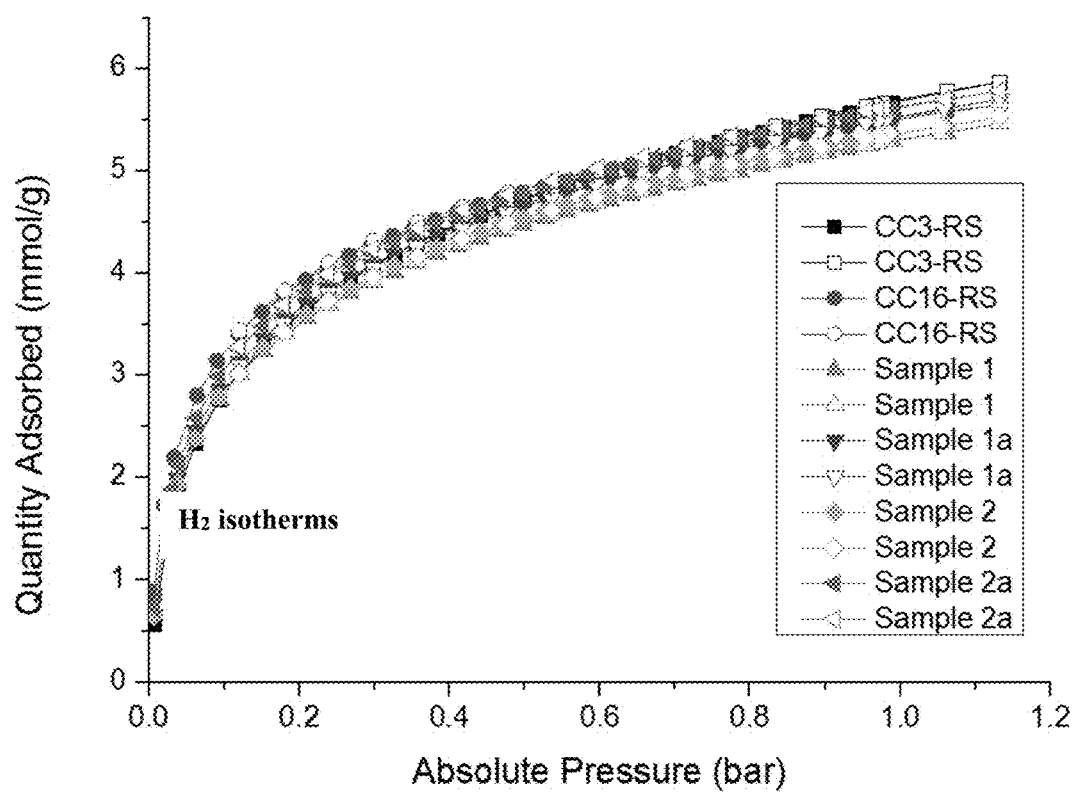
FIG. 4 illustrates $H_2$ isotherms for CC3-RS, CC16-RS, Sample 1, Sample 1a, Sample 2 and Sample 2a. Filled and open symbols represent adsorption and desorption, respectively.
Figure 5:
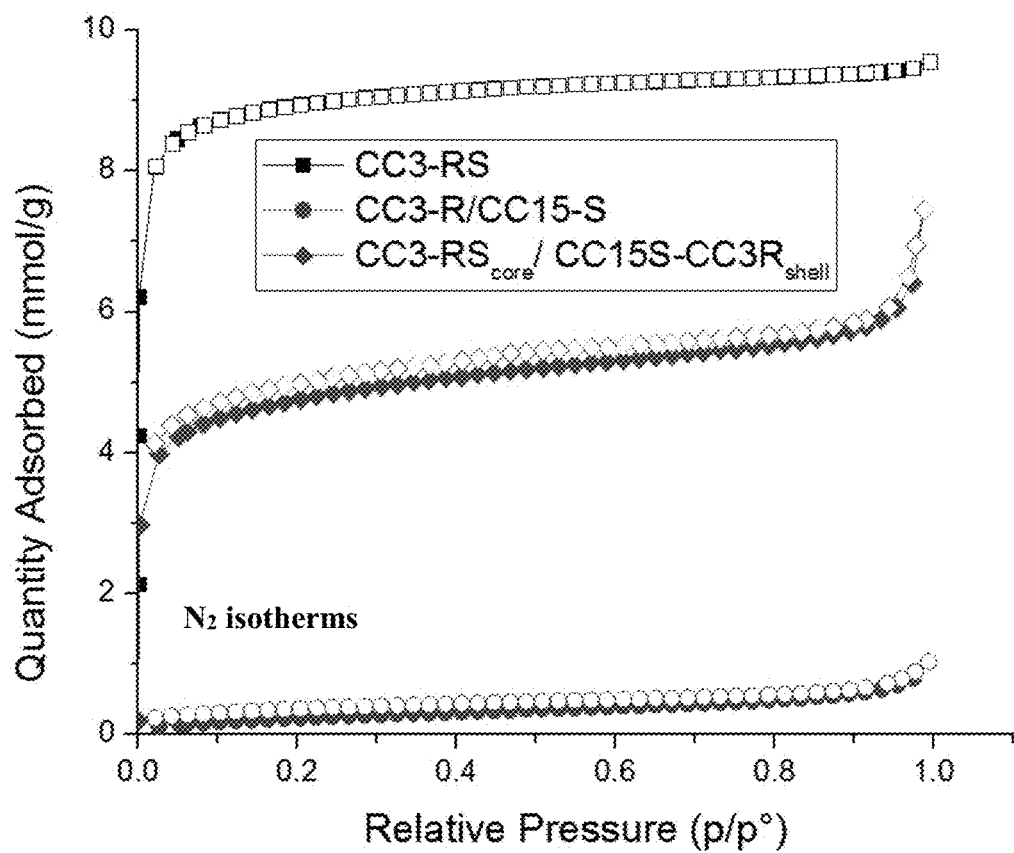
FIG. 5 illustrates $N_2$ isotherms for CC3-RS, CC3-RS$_{core}$/CC15-S-CC3-R$_{shell}$ crystals, and CC3R-CC15S co-crystals. Filled and open symbols represent adsorption and desorption, respectively.
Figure 6:
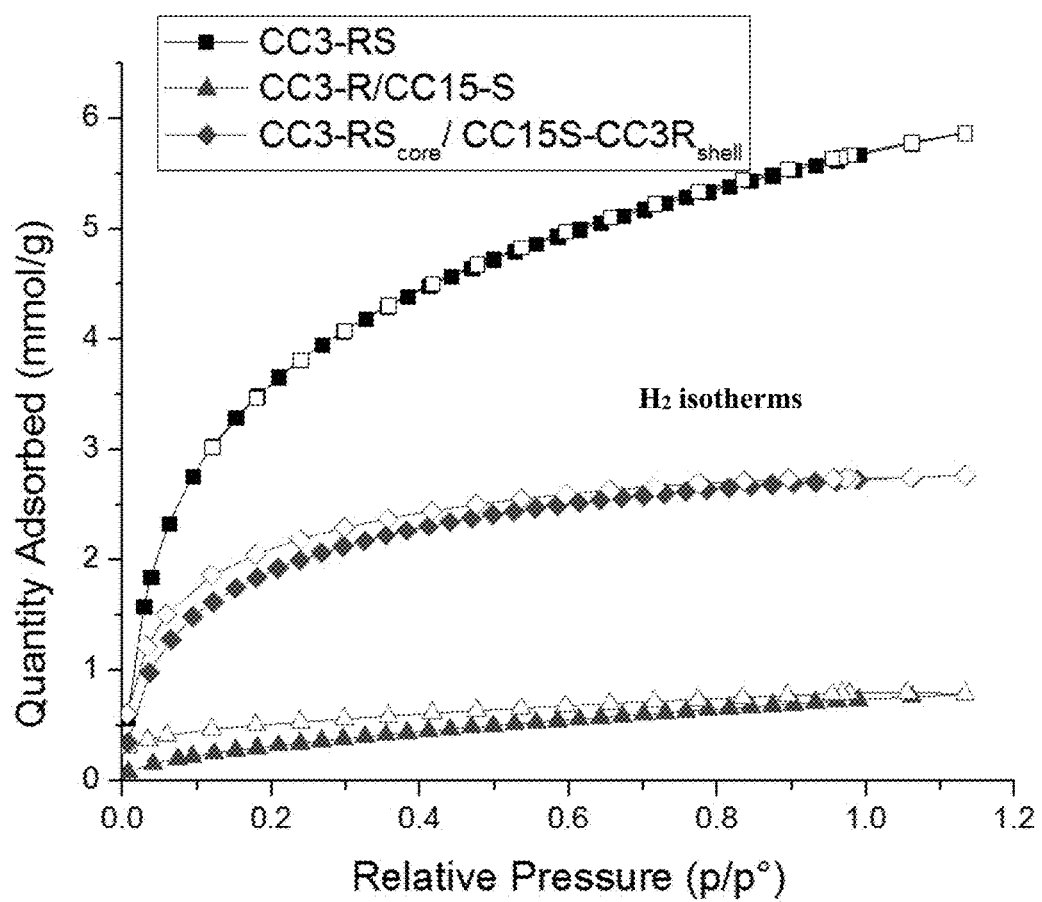
FIG. 6 illustrates $H_2$ isotherms for CC3-RS, CC3-RS$_{core}$/CC15-S-CC3-R$_{shell}$ crystals, and CC3R-CC15S co-crystals. Filled and open symbols represent adsorption and desorption, respectively.
Figure 7:
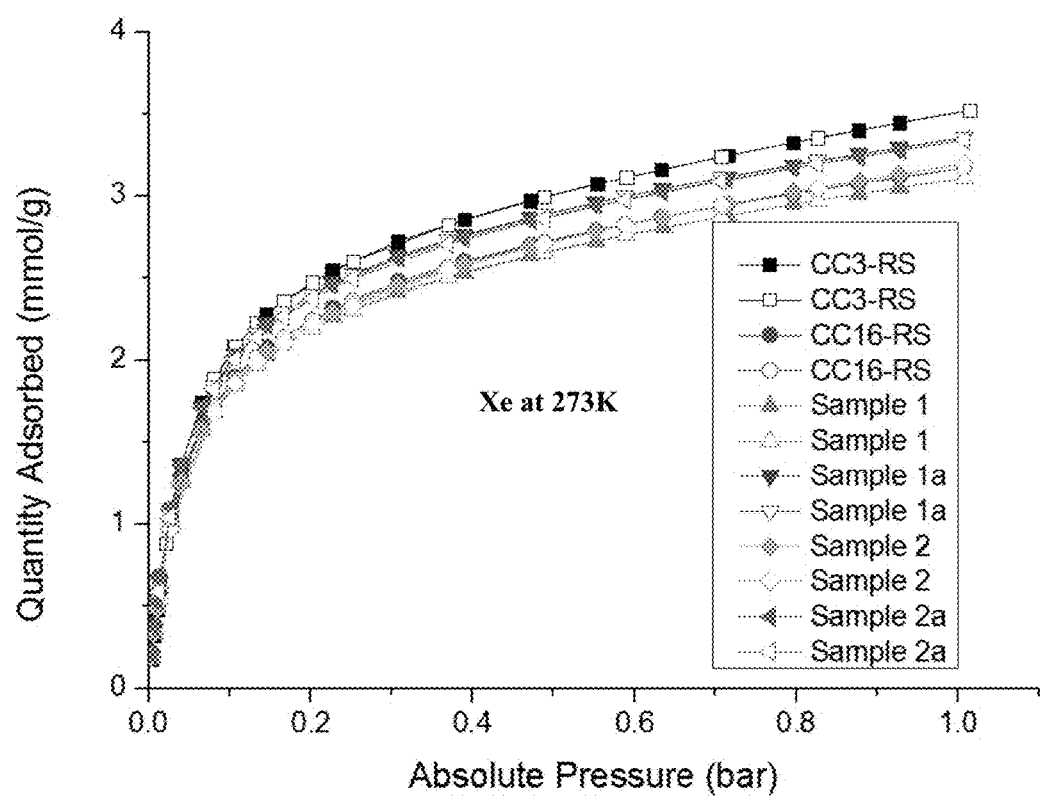
FIG. 7 illustrates Xe isotherms for CC3-RS, CC16-RS, Sample 1, Sample 1a, Sample 2 and Sample 2a. Filled and open symbols represent adsorption and desorption, respectively.
Figure 8:
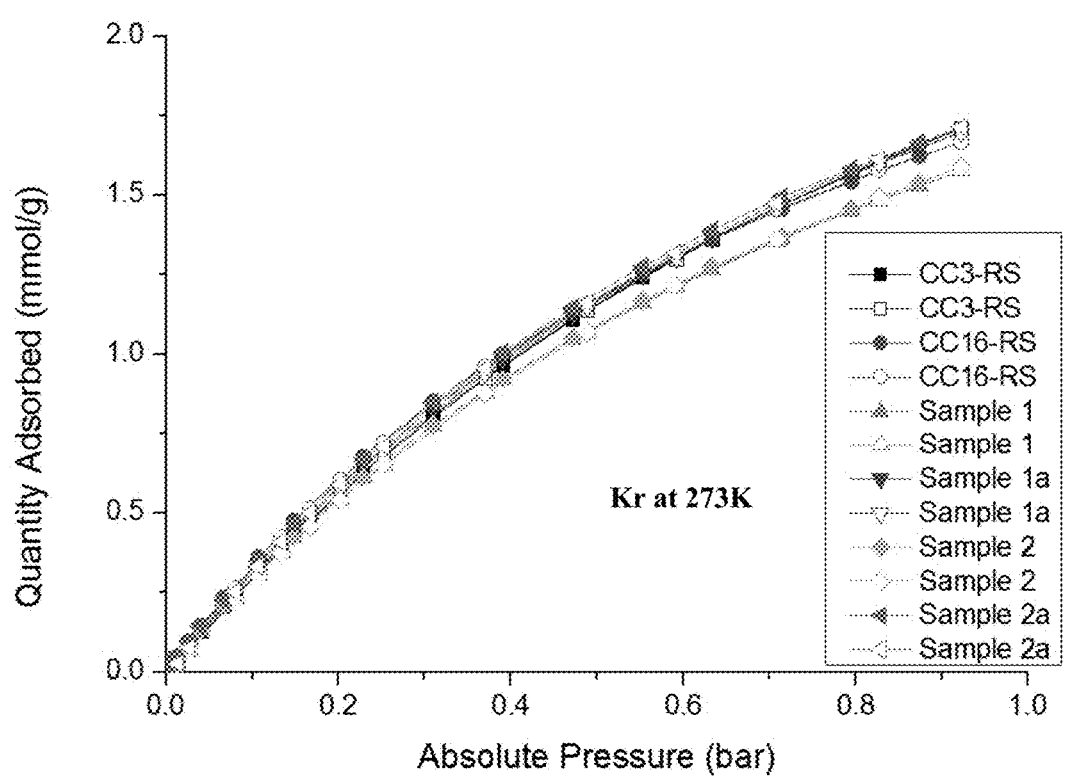
FIG. 8 illustrates Kr isotherms for CC3-RS, CC16-RS, Sample 1, Sample 1a, Sample 2 and Sample 2a. Filled and open symbols represent adsorption and desorption, respectively.

The materials were also able to adsorb a large amount of H$_2$. Sample 1a (CC3-RS$_{core}$/CC16-RS$_{shell}$) and Sample 2a (CC16-RS$_{core}$/CC3-RS$_{shell}$) had total H$_2$ uptake of 5.70 and 5.78 mmol g$^{-1}$, respectively, at 77 K and 1.0 bar, as shown in FIG. 4. The H$_2$ uptakes for CC3-RS and CC16-RS were 5.87 and 5.65 mmol g$^{-1}$, respectively. FIGS. 5 and 6 show N$_2$ and H$_2$ isotherms, respectively, for CC3-RS, CC3-R/CC15-S co-crystal and CC3-RS$_{core}$/CC15-S-CC3-R$_{shell}$. These materials were not only porous to N$_2$ and H$_2$, but also adsorb CO$_2$, CH$_4$, Xe, and Kr. FIGS. 7 and 8 show Xe and Kr isotherms, respectively.

Figures 9A, 9B:
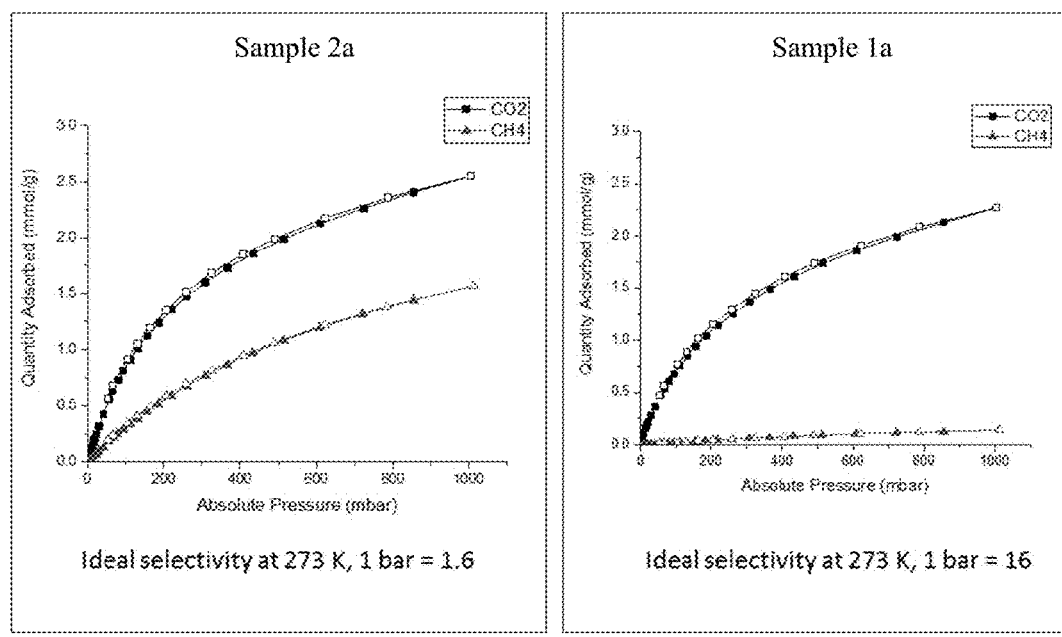
FIGS. 9a and 9b illustrate $CO_2$ selectivity for Sample 2a and Sample 1a, respectively. Filled and open symbols represent adsorption and desorption, respectively.
Figure 10A:
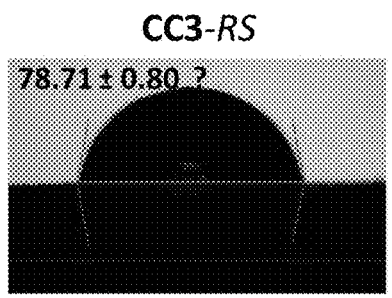
FIGS. 10a-10f illustrate contact angle measurements for CC3-RS, CC3-RS$_{core}$/CC16-RS$_{shell}$ (Sample 1a), CC16-RS, CC16-RS$_{core}$/CC3-RS$_{shell}$ (Sample 2a), CC3-R/CC15-S co-crystal and CC3-RS$_{core}$/CC15-S-CC3-R$_{shell}$ (Sample 3a).
Figure 10C:
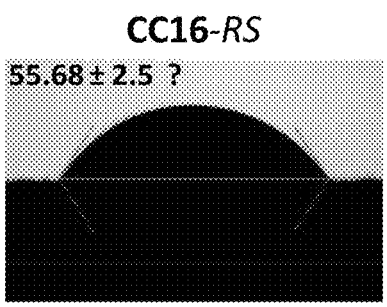
Figure 10E:
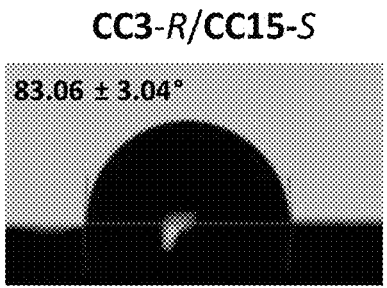
Figure 10B:
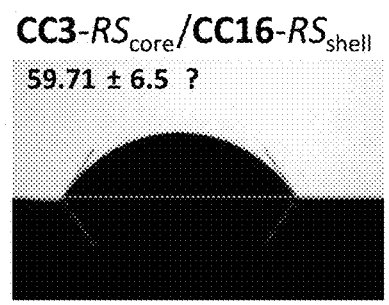
Figure 10D:
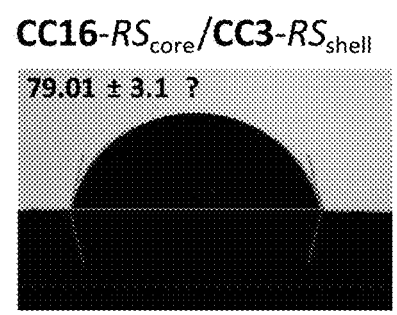
Figure 10F:
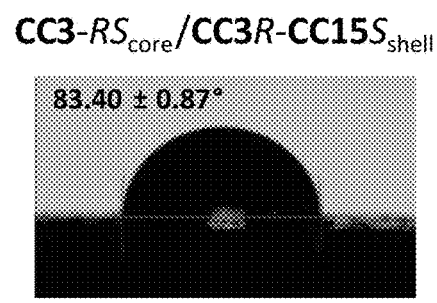

The selectivity of Sample 2a and Sample 1a for CO$_2$ in the presence of CH$_4$ was determined as shown in FIGS. 9a and 9b, respectively In FIGS. 9a and 9b, it is shown that depending on the core-shell sequence, selectivity toward CO$_2$ in the presence of CH$_4$ can be obtained.

Example 5—Surface Hydrophobicity

To measure the hydrophobicity of the core/shell materials, core/shell samples were pressed into pellets and water was dropped onto the surface of the materials to determine the contact angle. Hydrophobicity was measured by contact angle. Contact angle values were calculated from dynamic video files captured at 60 frames/s with one water droplet on top of a film made of the corresponding cages.

The results are shown in FIGS. 10a-10f. The particle sizes for these samples were 3 m. The contact angles gradually increased from 55.68±2.5° for CC16-RS, to 78.71±0.80° for CC3-RS, to 83.06±3.04° for CC3-R/CC15-S co-crystal. CC3-RS$_{core}$/CC16-RS$_{shell}$ (Sample 1a) showed a contact angle of 59.71±6.5° due to the hydrophilic nature of CC16 in the outer layer. In contrast, CC16-RS$_{core}$/CC3-RS$_{shell}$ (Sample 2a) exhibited a hydrophobic property with a contact angle of 79.01±3.10. The contact angle of CC3-RS$_{core}$/CC15-S-CC3-R$_{shell}$ (Sample 3a) was 83.40±0.87° which was slightly more hydrophobic due to the methyl groups of CC15. The surface properties such as hydrophobicity can be tuned via the core/shell morphology.

The invention claimed is:

1. A non-metallic porous organic composition comprising:
   a core comprising nitrogen-containing molecules; and
   a shell comprising nitrogen-containing molecules disposed around the core;
   wherein the shell is non-chemically bonded to the core; and
   wherein at least one of the core nitrogen-containing molecules is different from at least one of the shell nitrogen-containing molecules.

2. The composition of claim 1, wherein the nitrogen-containing molecules comprise one or more moieties selected from the group consisting of:

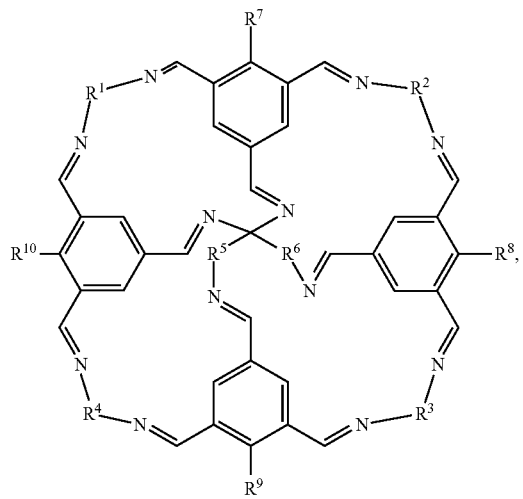

I

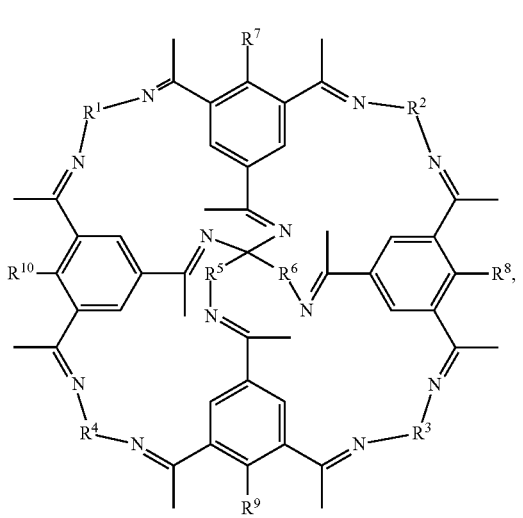

II

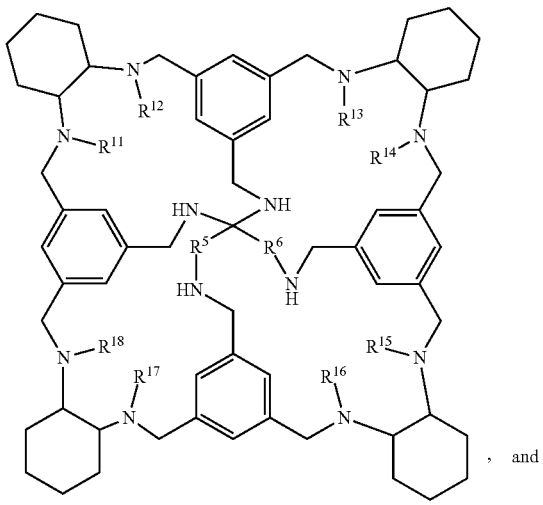

III

, and

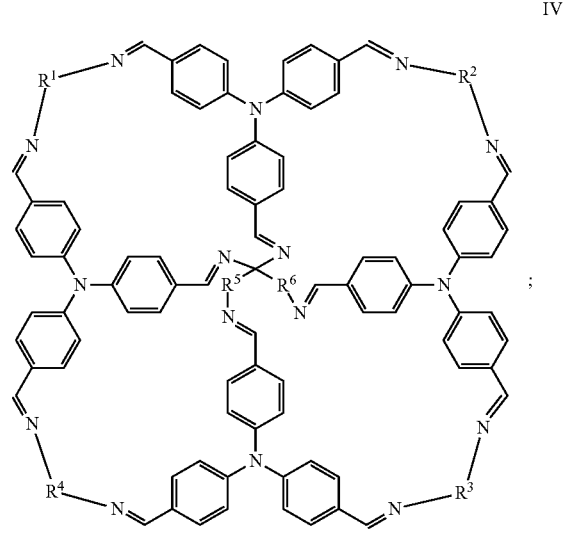

IV

;

wherein:

$R^1$, $R^2$, $R^3$, $R^4$, $R^5$, and $R^6$ are each independently

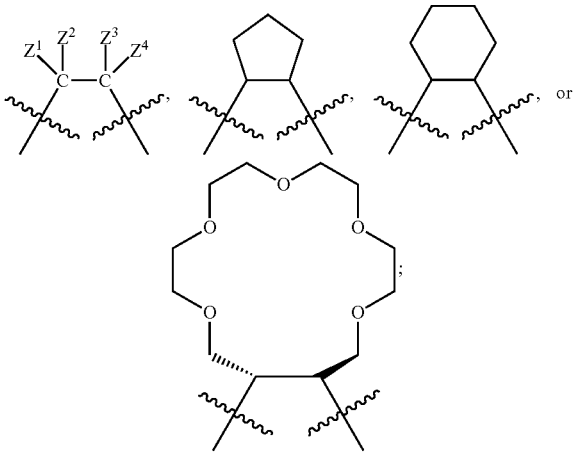

wherein $Z^1$, $Z^2$, $Z^3$, and $Z^4$ are each independently hydrogen, a $C_1$-$C_4$ alkyl or an optionally substituted aromatic group; $R^7$, $R^8$, $R^9$, and $R^{10}$ are each independently hydrogen or a hydroxyl; and $R^{11}$, $R^{12}$, $R^{13}$, $R^{14}$, $R^{15}$, $R^{16}$, $R^{17}$, and $R^{18}$ are each independently hydrogen or one or more of $R^{11}$ and $R^{12}$, $R^{13}$ and $R^{14}$, $R^{15}$ and $R^{16}$ or $R^{17}$ and $R^{18}$ are bonded to an optionally substituted $C_1$-$C_4$ alkylene.

3. The composition of claim 2, wherein $R^1$, $R^2$, $R^3$, $R^4$, $R^5$ and $R^6$ are the same.

4. The composition of claim 2, wherein $Z^1$, $Z^2$, $Z^3$, and $Z^4$ are each independently hydrogen, a $C_1$-$C_2$ alkyl or a phenyl group.

5. The composition of claim 2, wherein $R^1$, $R^2$, $R^3$, $R^4$, $R^5$, and $R^6$ are each independently

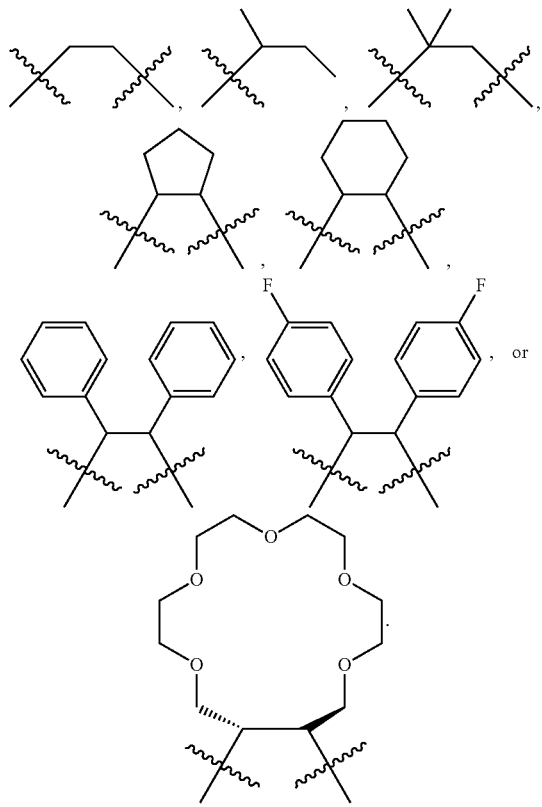

6. The composition of claim 2, wherein $R^7$, $R^8$, $R^9$, and $R^{10}$ are the same.

7. The composition of claim 2, wherein one or more of $R^{11}$ and $R^{12}$, $R^{13}$ and $R^{14}$, $R^{15}$ and $R^{16}$, or $R^{17}$ and $R^{18}$ are bonded to an optionally substituted $C_1$-$C_2$ alkylene.

8. The composition of claim 2, wherein the nitrogen-containing molecules comprise moieties corresponding in structure to moiety (I) or moiety (II), wherein $R^7$, $R^8$, $R^9$, and $R^{10}$ are each hydrogen.

9. The composition of claim 2, wherein the nitrogen-containing molecules comprise a moiety corresponding in structure to moiety (I), wherein $R^7$, $R^8$, $R^9$, and $R^{10}$ are each hydroxyl.

10. The composition of claim 2, wherein the nitrogen-containing molecules comprise moieties corresponding in structure to moiety (II) or moiety (IV), wherein $R^1$, $R^2$, $R^3$, $R^4$, $R^5$, and $R^6$ are each independently

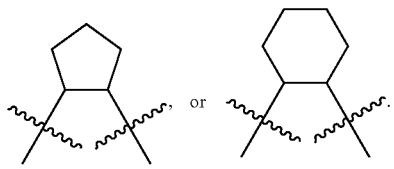 [SMILES: *C1CCCC1* ; *C1CCCCC1*]

11. The composition of claim 2, wherein the nitrogen-containing molecules comprise moieties corresponding in structure to moiety (III), wherein $R^5$ and $R^6$ are

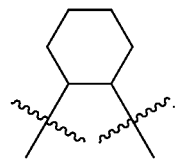

12. The composition of claim 1, wherein the nitrogen-containing molecules are selected from the group consisting of CC1, CC2, CC3, CC4, CC7, CC8, CC9, CC10, CC13, CC15, CC16, RCC3, AT-RCC3, TRCC3, TCC1, TCC2, TCC3, crown ether and a combination thereof.

13. The composition of claim 1, wherein the core and/or the shell comprise a combination of nitrogen-containing molecules.

14. The composition of claim 1, wherein the nitrogen-containing molecules comprise the R enantiomer, the S enantiomer, or racemate.

15. The composition of claim 1, wherein the core comprises racemic CC3 and the shell comprises racemic CC16; the core comprises racemic CC16 and the shell comprises racemic CC3; the core comprises racemic CC3 and the shell comprises racemic CC15; or the core comprises racemic CC15 and the shell comprises racemic CC3.

16. The composition of claim 1, wherein the shell and/or core/shell interface has substantially no cracks.

17. The composition of claim 1, wherein the composition has an adsorptive loading ratio for $CO_2$ over $CH_4$ of greater than or equal to 1.2.

18. The composition of claim 1, wherein the nitrogen-containing molecules have an octahedral, spherical, or tetragonal shape.

19. The composition of claim 1, wherein the composition is in the form of particles having an average particle diameter from about 10 nm to about 10000 μm.

20. The composition of claim 1, wherein the core and the shell are present in a weight ratio of core to shell of about 1:10 to about 1:2.

21. A method of making the composition of claim 1, the method comprising
sequentially adding a solution of the nitrogen-containing molecules and a solvent to the core molecules to create a product; and
evaporating the product to obtain the composition of claim 1.

22. A gas separation process comprising contacting a gas mixture containing at least one contaminant with the composition of claim 1.

23. The process of claim 22, wherein the at least one contaminant is $N_2$, $H_2$, $CO_2$, $CH_4$, Xe or Kr.

24. The process of claim 22, wherein the process comprises PSA, TSA, PPSA, PTSA, RCPSA, RCTSA, RC-PPSA or RC-PTSA.

* * * * *